US012684528B2

(12) United States Patent
Yamine

(10) Patent No.: US 12,684,528 B2
(45) Date of Patent: Jul. 14, 2026

(54) NETWORK NODE, USER EQUIPMENT AND METHODS IN A WIRELESS COMMUNICATIONS NETWORK

(71) Applicant: Telefonaktiebolaget LM Ericsson (publ), Stockholm (SE)

(72) Inventor: Badawi Yamine, Beirut (LB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 253 days.

(21) Appl. No.: 18/554,516

(22) PCT Filed: Apr. 9, 2021

(86) PCT No.: PCT/SE2021/050322
§ 371 (c)(1),
(2) Date: Oct. 9, 2023

(87) PCT Pub. No.: WO2022/216194
PCT Pub. Date: Oct. 13, 2022

(65) Prior Publication Data
US 2024/0196362 A1     Jun. 13, 2024

(51) Int. Cl.
*H04W 64/00*          (2009.01)
*H04W 56/00*          (2009.01)

(52) U.S. Cl.
CPC ..... *H04W 64/003* (2013.01); *H04W 56/0045* (2013.01)

(58) Field of Classification Search
CPC ........................ H04W 64/003; H04W 56/0045
See application file for complete search history.

(56) References Cited

U.S. PATENT DOCUMENTS

| | | | |
|---|---|---|---|
| 2011/0190010 A1 | 8/2011 | Cho | |
| 2014/0204931 A1 | 7/2014 | Jain | |
| 2016/0353313 A1* | 12/2016 | Reyes | ................... H04W 60/02 |
| 2017/0325284 A1 | 11/2017 | Pinheiro et al. | |

OTHER PUBLICATIONS

International Search Report and Written Opinion dated Dec. 22, 2021 for International Application No. PCT/SE2021/050322 filed Apr. 9, 2021, consisting of 12-pages.

(Continued)

*Primary Examiner* — Justin Y Lee
(74) *Attorney, Agent, or Firm* — Weisberg I.P. Law, P.A.

(57)          ABSTRACT

A method performed by a network node for controlling a Tracking Area Update, TAU, procedure of a User Equipment, UE The UE is configured with a first timer value relating to a first time interval to be used between subsequent signaled updates of the location of the UE in the TAU procedure. The network node determines that the UE is stationary when the UE has remained in the same tracking area for a period of time that exceeds a first threshold. When determined that the UE is stationary, the network node configures the UE with a second timer value relating to a second time interval to be used between subsequent signaled updates of the location of the UE in the TAU procedure. The time interval of second timer value is a time period longer than the time interval of the first timer value.

17 Claims, 16 Drawing Sheets

301. Determine that UE is stationary, when UE has remained in sam tracking area for period of time that exceeds first threshold.

302. Configure UE with second timer value relating to second time interval to be used between subsequent signalled updates of location of UE in TAU procedure.

303. Configure UE to report to network node when UE changes location

304. Determine that UE changes location, based on report from UE

305. When UE operates in idle mode, configure UE to use first timer value between subsequent signalled upates in TAU procedure.

306. Determine that UE is stationary when UE has remained in same tracking area for period of time that exceeds second threshold.

307. Determine that UE is non stationery when UE has remained in same tracking area for period of time that is below or equal second threshold.

308. Configure UE to use second timer value between subsequent signalled updates in TAU procedure.

309. Calculate a current timing advance value for UE.

310. Determine that UE has changed location when difference between stored timing advance value and current timing advance value exceeds third threshold.

311. Track location of UE

312. Determine that UE has not changed location when difference between stored timing advance value and current timing advance value is below or equal third threshold.

313. Determine that UE is stationary when difference between stored timing advance value and current timing advance value is below or equal third threshold for period of time that exceeds second threshold.

(56) References Cited

OTHER PUBLICATIONS

3GPP TS 24.301 V16.3.0; 3rd Generation Partnership Project; Technical Specification Group Core Network and Terminals; Non-Access-Stratum (NAS) protocol for Evolved Packet System (EPS); Stage 3 (Release 16); Dec. 2019, consisting of 570-pages.
3GPP TS 36.331 V15.9.0; 3rd Generation Partnership Project; Technical Specification Group Radio Access Network; Evolved Universal Terrestrial Radio Access (E-UTRA); Radio Resource Control (RRC); Protocol specification (Release 15); Mar. 2020, consisting of 964-pages.

* cited by examiner

100

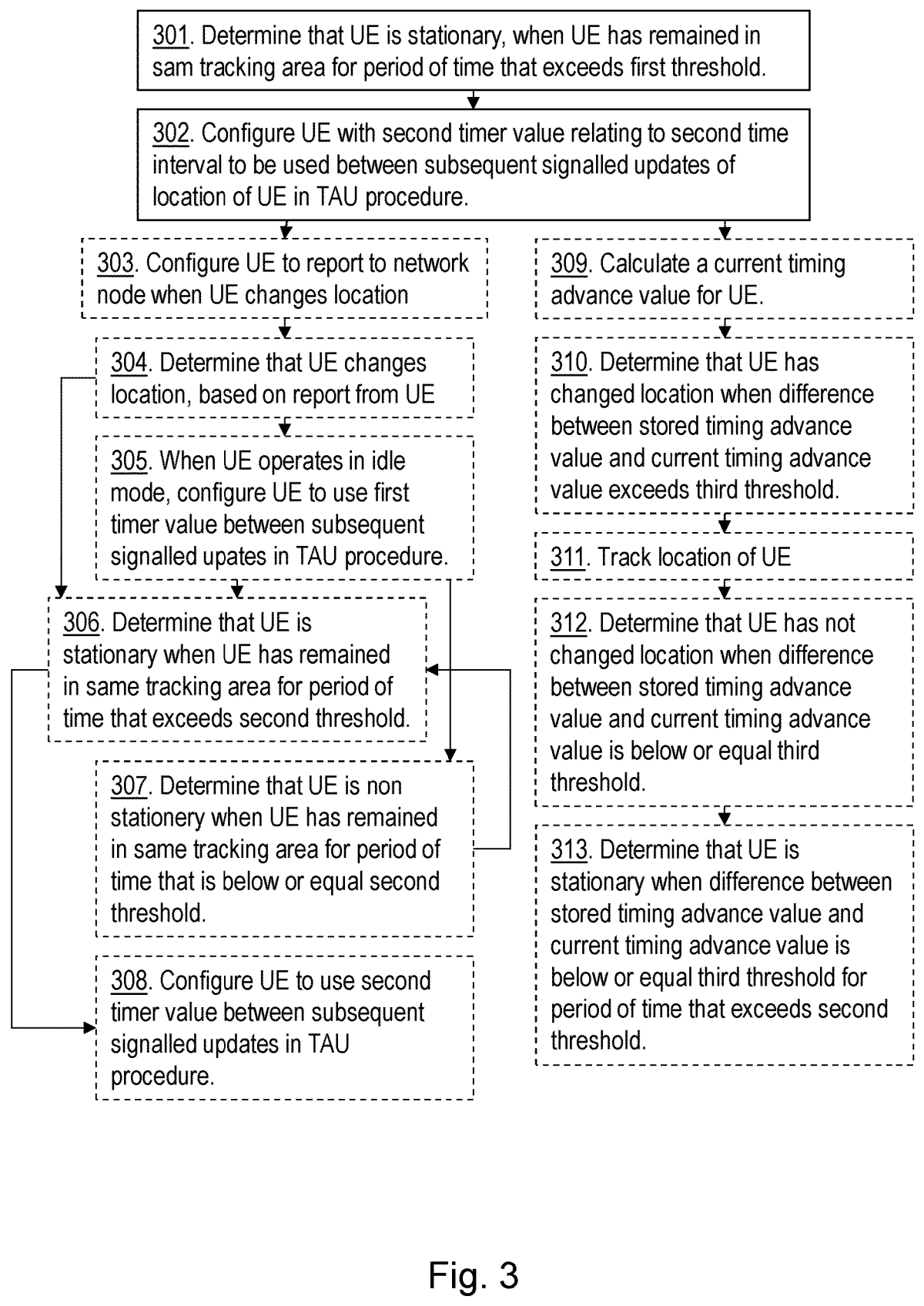

301. Determine that UE is stationary, when UE has remained in sam tracking area for period of time that exceeds first threshold.

302. Configure UE with second timer value relating to second time interval to be used between subsequent signalled updates of location of UE in TAU procedure.

303. Configure UE to report to network node when UE changes location

304. Determine that UE changes location, based on report from UE

305. When UE operates in idle mode, configure UE to use first timer value between subsequent signalled upates in TAU procedure.

306. Determine that UE is stationary when UE has remained in same tracking area for period of time that exceeds second threshold.

307. Determine that UE is non stationery when UE has remained in same tracking area for period of time that is below or equal second threshold.

308. Configure UE to use second timer value between subsequent signalled updates in TAU procedure.

309. Calculate a current timing advance value for UE.

310. Determine that UE has changed location when difference between stored timing advance value and current timing advance value exceeds third threshold.

311. Track location of UE

312. Determine that UE has not changed location when difference between stored timing advance value and current timing advance value is below or equal third threshold.

313. Determine that UE is stationary when difference between stored timing advance value and current timing advance value is below or equal third threshold for period of time that exceeds second threshold.

Fig. 3

401. Receive configuration from network node, which configuration configures UE with second timer value to be used between subsequent signalled updates in TAU procedure.

402.Determine that UE is stationary when UE has remained in first cell in tracking area for period of time that exceeds fourth threshold.

403. Apply received configuration.

Flow B

Flow C

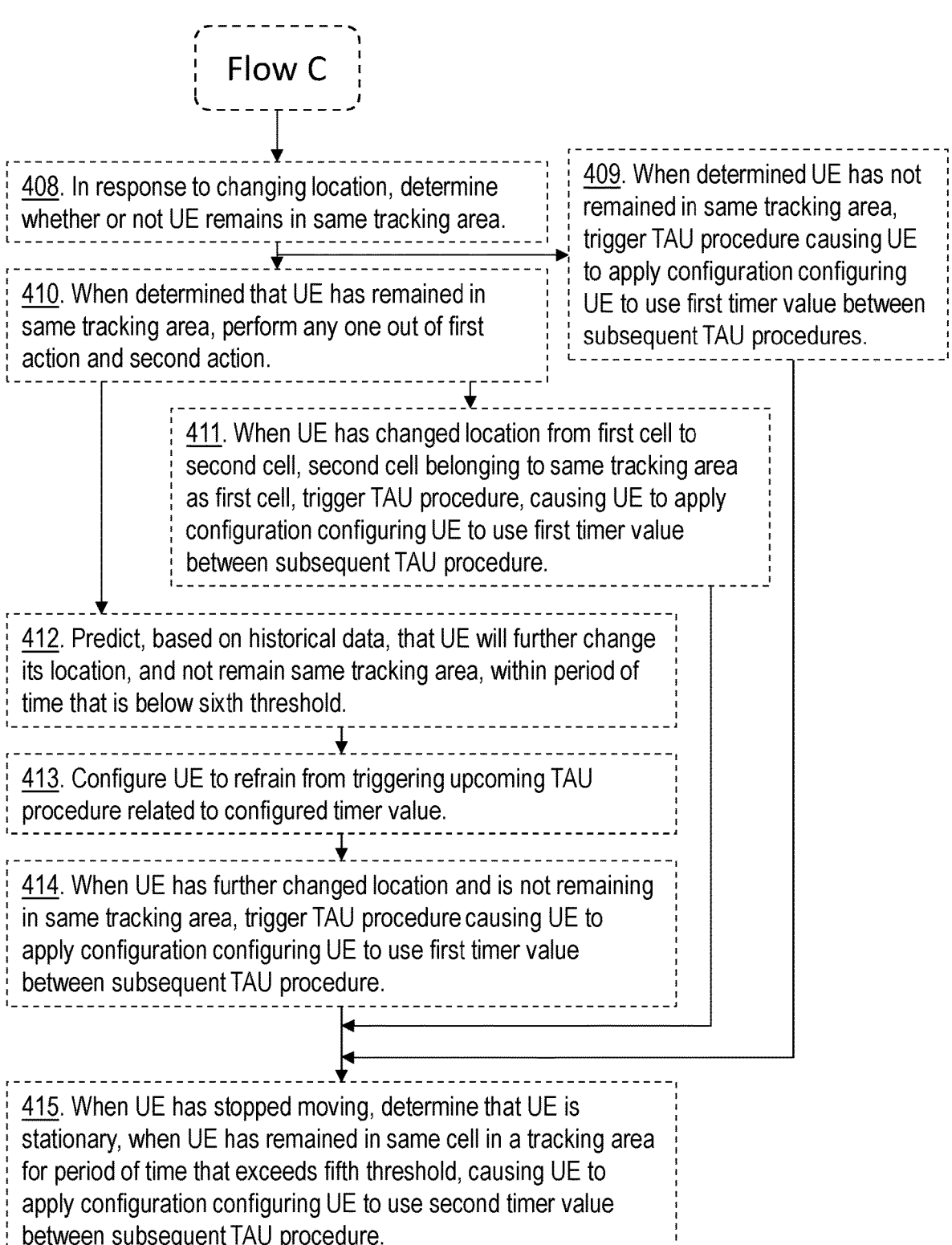

Flow C

408. In response to changing location, determine whether or not UE remains in same tracking area.

409. When determined UE has not remained in same tracking area, trigger TAU procedure causing UE to apply configuration configuring UE to use first timer value between subsequent TAU procedures.

410. When determined that UE has remained in same tracking area, perform any one out of first action and second action.

411. When UE has changed location from first cell to second cell, second cell belonging to same tracking area as first cell, trigger TAU procedure, causing UE to apply configuration configuring UE to use first timer value between subsequent TAU procedure.

412. Predict, based on historical data, that UE will further change its location, and not remain same tracking area, within period of time that is below sixth threshold.

413. Configure UE to refrain from triggering upcoming TAU procedure related to configured timer value.

414. When UE has further changed location and is not remaining in same tracking area, trigger TAU procedure causing UE to apply configuration configuring UE to use first timer value between subsequent TAU procedure.

415. When UE has stopped moving, determine that UE is stationary, when UE has remained in same cell in a tracking area for period of time that exceeds fifth threshold, causing UE to apply configuration configuring UE to use second timer value between subsequent TAU procedure.

Fig. 4c

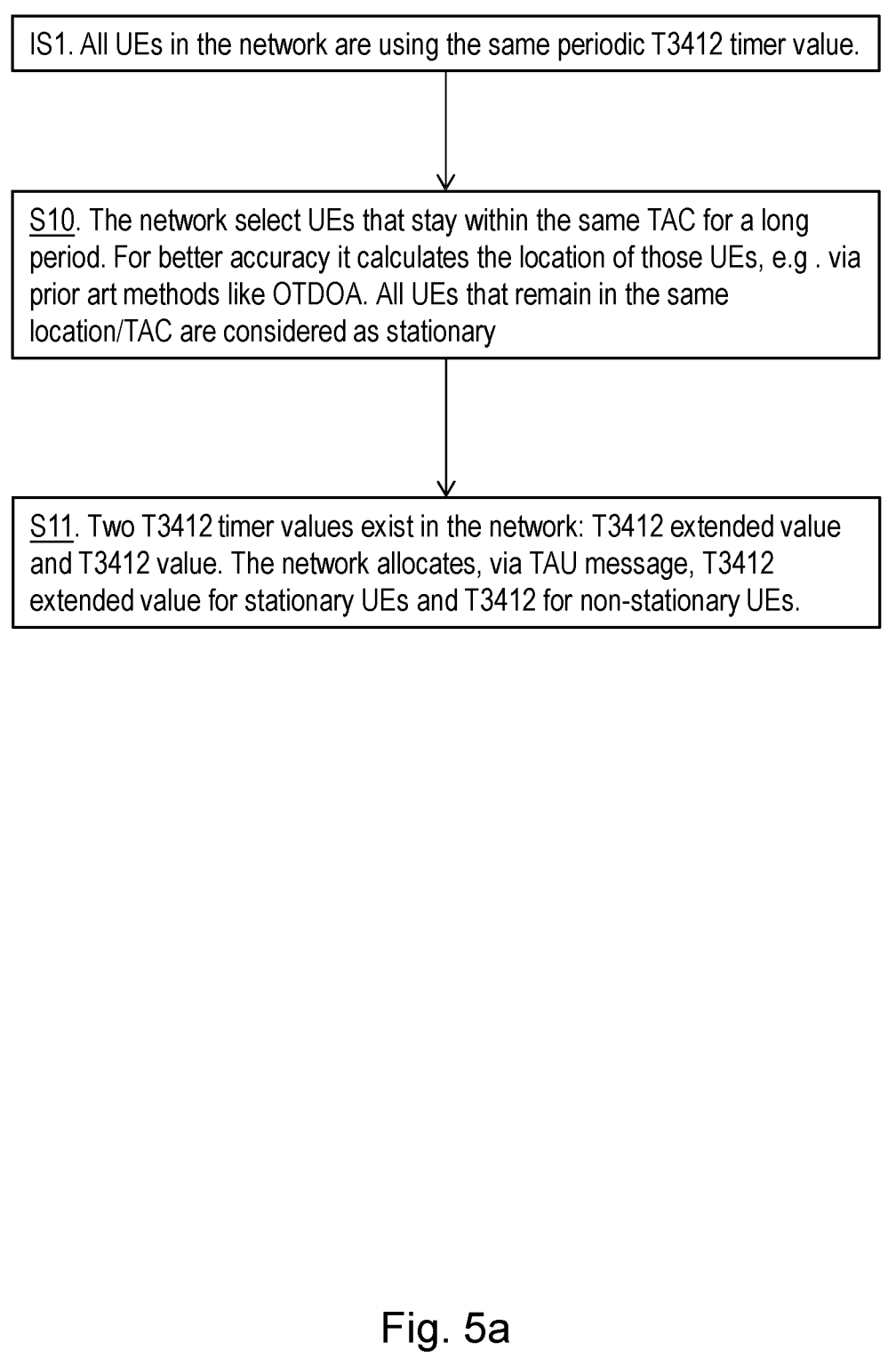

IS1. All UEs in the network are using the same periodic T3412 timer value.

S10. The network select UEs that stay within the same TAC for a long period. For better accuracy it calculates the location of those UEs, e.g . via prior art methods like OTDOA. All UEs that remain in the same location/TAC are considered as stationary S11. Two T3412 timer values exist in the network: T3412 extended value and T3412 value. The network allocates, via TAU message, T3412 extended value for stationary UEs and T3412 for non-stationary UEs.

Fig. 5a

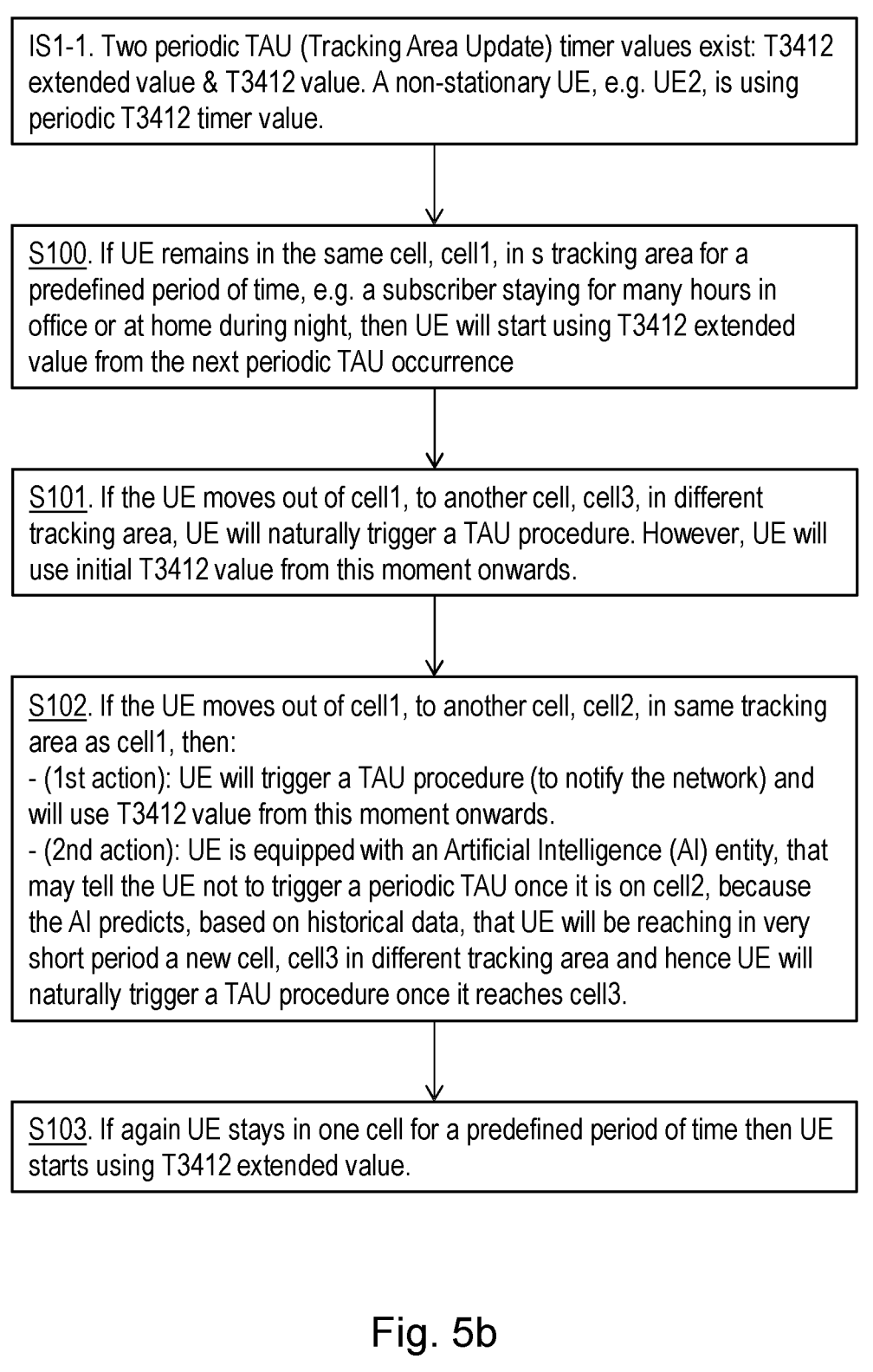

IS1-1. Two periodic TAU (Tracking Area Update) timer values exist: T3412 extended value & T3412 value. A non-stationary UE, e.g. UE2, is using periodic T3412 timer value.

S100. If UE remains in the same cell, cell1, in s tracking area for a predefined period of time, e.g. a subscriber staying for many hours in office or at home during night, then UE will start using T3412 extended value from the next periodic TAU occurrence S101. If the UE moves out of cell1, to another cell, cell3, in different tracking area, UE will naturally trigger a TAU procedure. However, UE will use initial T3412 value from this moment onwards.

S102. If the UE moves out of cell1, to another cell, cell2, in same tracking area as cell1, then:
- (1st action): UE will trigger a TAU procedure (to notify the network) and will use T3412 value from this moment onwards.
- (2nd action): UE is equipped with an Artificial Intelligence (AI) entity, that may tell the UE not to trigger a periodic TAU once it is on cell2, because the AI predicts, based on historical data, that UE will be reaching in very short period a new cell, cell3 in different tracking area and hence UE will naturally trigger a TAU procedure once it reaches cell3.

S103. If again UE stays in one cell for a predefined period of time then UE starts using T3412 extended value.

Fig. 5b

<u>IS2</u>. A stationary UE is at same location for long period.

<u>S20</u>. 1. The network commands the stationary UE to detect & then report any move via a new parameter that could be added to one existing RRC message, e.g. RRCConectionReconfiguration.
2. The stationary UE is equipped with a software entity so that whenever it moves from its habitual location it has to notify the network about such move.

<u>S21</u>. A stationary UE is considered as 'moved' if one or more of the following entities has changed
- (immediately), e.g. the UE is equipped with movement tools like accelerometer, gyroscope.
- (continuous check of UE location), e.g. UE is equipped with a GPS,
- (cell basis),
- (A continuous check of radio fingerprint),
- (UE Rx – Tx time difference).

<u>S22</u>. Two methods are used: One at network (Steps 210 & 211) & a second at UE (Step 220).

<u>S210</u>. The stationary UE notifies the network immediately after it detects a UE movement based on step 21 above. For that purpose a new parameter, denoted 'UE has moved' and coded in 1 bit is added to existing RRC Measurement report message.

<u>S220</u>. The UE tracks its own movement. However the UE does not send any report to the network until it is settled in a new location.

<u>S211</u>. When the network receives 'UE has moved' = 1, it will start calculating UE location via any prior art method like OTDOA until UE settles in a new location Y. Note that in case the UE is in idle mode, the network will send in TAU Accept message a small T3412 timer value and during each TAU procedure the network will calculate UE location.

Fig. 5c

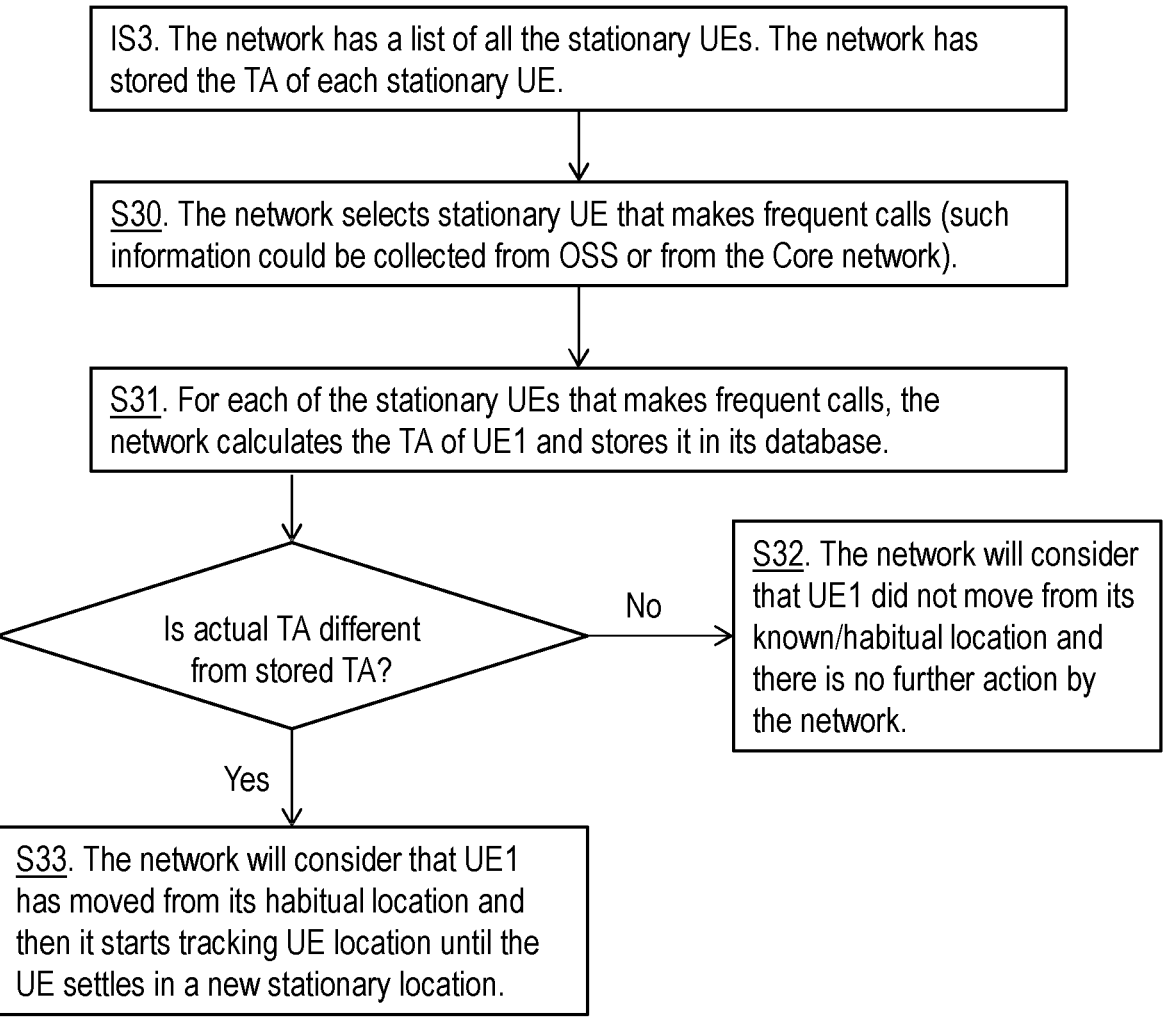

IS3. The network has a list of all the stationary UEs. The network has stored the TA of each stationary UE.

S30. The network selects stationary UE that makes frequent calls (such information could be collected from OSS or from the Core network).

S31. For each of the stationary UEs that makes frequent calls, the network calculates the TA of UE1 and stores it in its database.

Is actual TA different from stored TA?

No

S32. The network will consider that UE1 did not move from its known/habitual location and there is no further action by the network.

Yes

S33. The network will consider that UE1 has moved from its habitual location and then it starts tracking UE location until the UE settles in a new stationary location.

Fig. 5d

Computer program 795

Carrier 796

Memory 791

Processor 790

Input/Output Interface 700

UE 121

Receiving Unit 710

Applying Unit 720

Reporting Unit 730

Determining Unit 740

Performing Unit 750

Triggering Unit 760

Predicting Unit 770

Configuring Unit 780

UE 121

NETWORK NODE, USER EQUIPMENT AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2021/050322, filed Apr. 9, 2021 entitled "NETWORK NODE, USER EQUIPMENT AND METHODS IN A WIRELESS COMMUNICATIONS NETWORK," the entirety of which is incorporated herein by reference.

TECHNICAL FIELD

Embodiments herein relate to a network node, a User Equipment and methods therein. In some aspects, they relate to controlling a Tracking Area Update procedure in a wireless communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Thanks to Internet of Things (IoT) millions of smart sensors will be implemented in every wireless network. Already millions of sensors have been implemented worldwide by using mobility wireless technology such as 2G, 3G, 4G and now 5G, but also other wireless technology like LORA, Sigfox, WiFi and others.

In Non Access Stratum (NAS) specification, 3GPP 24.301, an operator has the choice to configure a UE with one of two values for a periodic Tracking Area Update (TAU) procedure. These are the T3412 value or the T3412 extended value. Usually the value of T3412 is around 1 hour. In live networks the default for T3412 is 54 minutes and T3412 extended value is much higher. One use of T3412 extended value is to reduce the load caused by many periodic update procedures in the network. In fact, by enlarging the value of T3412, e.g. 10 hours, the number of periodic TAU procedure for a UE will be reduced by 10 times in comparison to the usual value of T3412 that is 1 hour.

Positioning Latency in LTE and Other Cellular Systems

Positioning in Long Term Evolution (LTE) is e.g. described in "Positioning in LTE, Handbook of Position Location, Theory Practice and Advances, chapter 32, Hoboken: NJ, IEEE Press & Wiley, 2012", by authors A. Kangas, I. Siomina and T. Wigren.

In particular it describes a positioning architecture, positioning methods and their performance. The following positioning methods are available in the LTE cellular system:
Cell Identity (CID)—Determines the UE position with cell granularity.
Enhanced Cell Identity (E-CID)—Cell identity is combined with auxiliary radio measurements such as:
Timing Advance (TA)
UE Rx-Tx—UE frame latency
Angle of Arrival (AoA)
Radio signal strength related measurements
Radio Frequency (RF) fingerprinting
Adaptive Enhanced Cell Identity (AECID)
Observed Time Difference of Arrival (OTDOA)
Uplink Time Difference of Arrival (U-TDOA)
Assisted Global Navigation Satellite System (A-GNSS)—Satellite based positioning including Assisted Global Positioning System (A-GPS), Galileo and Global Navigation Satellite System (GLONASS)
The above publication also discusses the positioning times of the listed positioning methods (protocol delays are not taken into account and would needed to be also added). The following rough figures may be given as an indication of the positioning times of the listed positioning methods:
CID—much less than a second
E-CID—much less than a second to 2-3 seconds
RF-fingerprinting—1-10 seconds depending on filtering
AECID—less than a second to 2-3 seconds
OTDOA—3-20 s
U-TDOA—3-20 s
A-GNSS—5-30 s
Positioning times are similar in other cellular systems. The times may be much longer for low complexity UEs such as Machine Type Communication (MTC) or Narrowband (NB)-Internet of Things (IoT) UEs. The most commonly used method for a low complexity UE to report its location comprises reporting a cell identity of cell where it is located.

SUMMARY

As part of developing embodiments herein a problem was identified by the inventor and will first be discussed.

A problem is that there is neither a way for a wireless communications network, nor a UE, to control a TAU procedure for a UE that is stationary. This since the wireless communications network does not distinguish between a stationary UE and a non-stationary UE and that UEs, whether stationary or not, use the same time interval between location updates in a TAU procedure. This may lead to unnecessary signaling and an increased traffic load, and thus a decreased performance of the wireless communications network.

An object of embodiments herein is to improve the performance of a wireless communications network.

According to an aspect of embodiments herein, the object is achieved by a method performed by a network node for controlling a Tracking Area Update, TAU, procedure of a User Equipment, UE, in a wireless communications network. The TAU procedure is to signal subsequent updates of the location of the UE to the network node. The UE is configured with a first timer value relating to a first time interval to be used between subsequent signaled updates of the location of the UE in the TAU procedure.

The network node determines that the UE is stationary, when the UE has remained in the same tracking area for a period of time that exceeds a first threshold.

When determined that the UE is stationary, the network node configures the UE with a second timer value. The second timer value relates to a second time interval to be used between subsequent signaled updates of the location of the UE in the TAU procedure. The time interval of the second timer value is a time period longer than the time interval of the first timer value.

According to an another aspect of embodiments herein, the object is achieved by a method performed by a User Equipment, UE, for controlling a Tracking Area Update, TAU, procedure of the UE in a wireless communications network. The TAU procedure is to signal subsequent updates of the location of the UE to the network node. The UE is configured with a first timer value relating to a first time interval to be used between subsequent signaled updates of the location of the UE in the TAU procedure.

The UE receives a configuration from the network node. The configuration configures the UE with a second timer value relating to a second time interval to be used between subsequent signaled updates of the location of the UE in the TAU procedure. The time interval of second timer value is a time period longer than the time interval of the first timer value.

When determined that the UE is stationary, the UE applies the received configuration.

According to an another aspect of embodiments herein, the object is achieved by a network node configured to control a Tracking Area Update, TAU, procedure of a User Equipment, UE, in a wireless communications network. The TAU procedure is to signal subsequent updates of the location of the UE to the network node. The UE is configured with a first timer value relating to a first time interval adapted to be used between subsequent signaled updates of the location of the UE in the TAU procedure. The network node is further configured to:

Determine that the UE is stationary, when the UE has remained in the same tracking area for a period of time that exceeds a first threshold, and when determined that the UE is stationary, configure the UE with a second timer value relating to a second time interval adapted to be used between subsequent signaled updates of the location of the UE in the TAU procedure, wherein the time interval of second timer value is adapted to be a time period longer than the time interval of the first timer value.

According to an another aspect of embodiments herein, the object is achieved by a User Equipment, UE, configured to control a Tracking Area Update, TAU, procedure of the UE in a wireless communications network. The TAU procedure is to signal subsequent updates of the location of the UE to the network node. The UE is configured with a first timer value relating to a first time interval adapted to be used between subsequent signaled updates of the location of the UE in the TAU procedure. The UE is further configured to:

receive a configuration from the network node, which configuration is adapted to configure the UE with a second timer value relating to a second time interval to be used between subsequent signaled updates of the location of the UE in the TAU procedure, wherein the time interval of second timer value is adapted to be a time period longer than the time interval of the first timer value, and when determined that the UE is stationary, apply the received configuration.

Thanks to that the network node determines that the UE is stationary, it is possible for the network node to configure the UE with the second timer interval related to the second time value to be used between subsequent signaled updates of the location of the UE. The UE applies the received configuration and the second time interval is used between subsequent signaled location updates to the network node and the TAU procedure is controlled. In this way an efficient mechanism for controlling TAU procedures is achieved.

Embodiments herein bring the advantage of an efficient mechanism improving the control of TAU procedures. This is achieved by making it possible to determine that a UE is stationary, e.g. when the UE stays in the same tracking area for period of time that exceeds a threshold, and controlling the TAU procedure by configuring the stationary UE to use a longer time interval between subsequent signaled location updates in the TAU procedure, which leads a more efficient controlling of TAU procedures. This results in improved performance in a wireless communications network.

BRIEF DESCRIPTION OF THE DRAWINGS

Examples of embodiments herein are described in more detail with reference to attached drawings in which:

FIG. 3 is a flowchart depicting embodiments of a method in a network node.

FIGS. 5a, b, c, and d are flowcharts depicting embodiments of a method.

DETAILED DESCRIPTION

Figure 1:
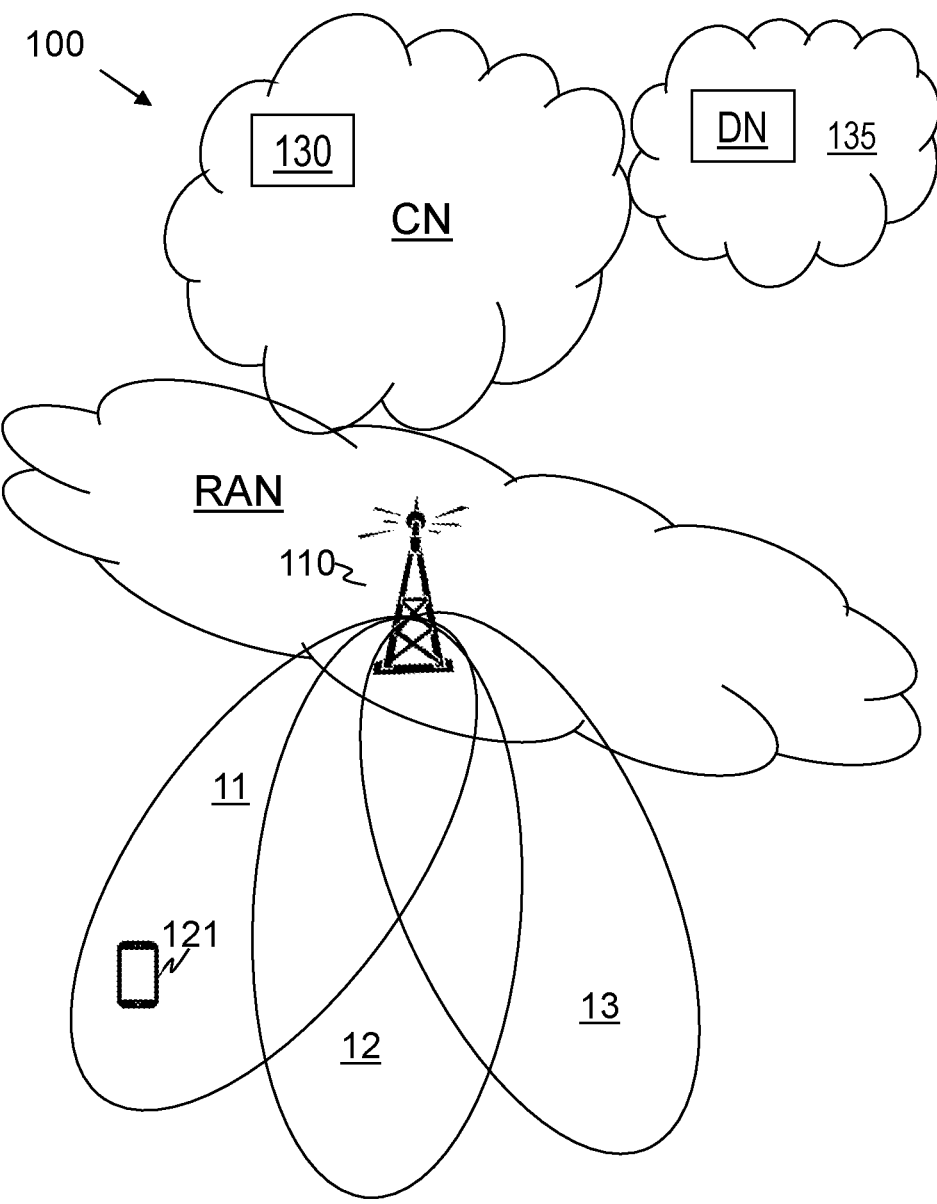
FIG. 1 is a schematic block diagram illustrating embodiments of a wireless communications network.

As a part of developing embodiments herein a problem was identified by the inventors and will first be discussed.

A stationary UE is a UE that stays in its location for a long period of time. In a wireless communications network, any UE whether it is a low complex UE or not, may be stationary, e.g. a smart fire sensor implemented in a forest, or it may be non-stationary, e.g. the same smart fire sensor implemented in a moving truck. The wireless communications network does not distinguish between stationary and non-stationary when allocating T3412 timer value. Rather all UEs, stationary and non-stationary, use the same periodic TAU timer value, which is usually around 1 hour. This is a problem because making a stationary UE keep triggering a periodic TAU procedure every 1 hour, while it is known in advance that it is not moving from its geographical location, generate a waste of signaling and processing. The problem becomes more relevant when it is known that millions of such smart sensors will be implemented in the wireless communications network in the coming years.

Another problem is that, between two periodic TAU procedures, it is not possible to track the location of a low complex UE that seldom exchange data with the wireless communications network. Suppose that a low complex UE, e.g. a smart fire alarm is implemented in a house. Suppose that devices, such as the UE, in the house is being served by a cell, which belongs to a tracking area that is composed of 100 cells. Suppose that the UE has applied the T3412 extended value, e.g. 10 hours, for the TAU procedure. If the last periodic TAU was triggered at 01:00 pm at the house and at 03:00 pm the UE was moved to another house being served by another cell that belongs to the same tracking area, it reads broadcasted System Information (SI) of the new cell. However, as the new cell belongs to the same tracking area as the previous cell, the UE does not trigger a TAU procedure. Next time the UE will trigger a TAU will be at 01:00+10 hours=11:00 pm. Suppose that the UE suffers a failure at 05:00 μm. The next time the UE is expected to trigger a periodic TAU procedure it is at 11:00 μm. When time reaches 11:00 pm, as there is no TAU procedure received from the UE by the wireless communications network, the wireless communications network may consider that the UE has failed. The problem is that if an operator wants to send someone to replace the failed UE, the only data that it has got corresponds to the last working location, which is the first house where the UE has reported its last periodic TAU. This information is outdated since the UE has been moved to another location.

By allocating the T3412 extended value to a stationary UE, signaling and processing in the wireless communications network will decrease.

By configuring the UE to report any changes of its location to network according to example embodiments herein, the wireless communications network is able to keep track of the location of the UE between periodic TAU procedures.

Example embodiments herein provides methods that improves the controlling of TAU procedures by allowing a network node that determines that a UE is stationary to configure the UE with a longer time interval between subsequent location updates in a TAU procedure. The enables the network node to control a TAU procedure for stationary UEs.

Further, embodiments herein provide methods that improves the controlling of TAU procedures by allowing a stationary UE to apply a configuration that configures the UE to use a longer time interval between subsequent location updates in a TAU procedure. This results in an improved performance of the wireless communications network controlling TAU procedures.

FIG. 1 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

One or more UEs such as e.g. a UE 121, operate in the wireless communications network 100. The UE 121 may e.g. be a wireless device, an NR device, a mobile station, a wireless terminal, an NB-IoT device, an MTC device, an eMTC device, a CAT-M device, a WiFi device, an LTE device and an a non-access point (non-AP) STA, a STA, that communicates via a base station such as e.g. a network node 110, one or more Access Networks (AN), e.g. a RAN, to one or more core network (CN) nodes such as e.g. a network node 130, in one or more CNs. It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a first cell 11 provided by a network node 110.

Base stations such as the network node 110, operate in the wireless communications network 100. The network node 110 provides a first cell 11, and possibly a neighbor second cell 12 and third cell 13. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with UEs such as a UE 121, within a first cell 11, served by the network node 110 may be referred to as a serving radio network node and communicates with the UE 121 with Downlink (DL) transmissions to the UE 121 and Uplink (UL) transmissions from the UE 121. The second cell 12 and third cell 13, among neighbor cells to the first cell 11, may be served by a second network node, not shown in FIG. 1, capable of communicating with UEs such as the UE 121. The first cell 11 and the second cell 12 may belong to the same tracking area and the third cell 13 may belong to different tracking area.

Network nodes such as the network node 130, operate in the CN of the wireless communications network 100. The network node 130 may be e.g. a Mobility Management Entity (MME) or a Access and Mobility Management Function (AMF).

Methods according to embodiments herein are performed by the network node 110, 130 and the UE 121. These nodes may be Distributed Nodes (DN)s and functionality, e.g. comprised in a cloud 135 as shown in FIG. 1 may be used for performing or partly performing the methods.

Figure 2:
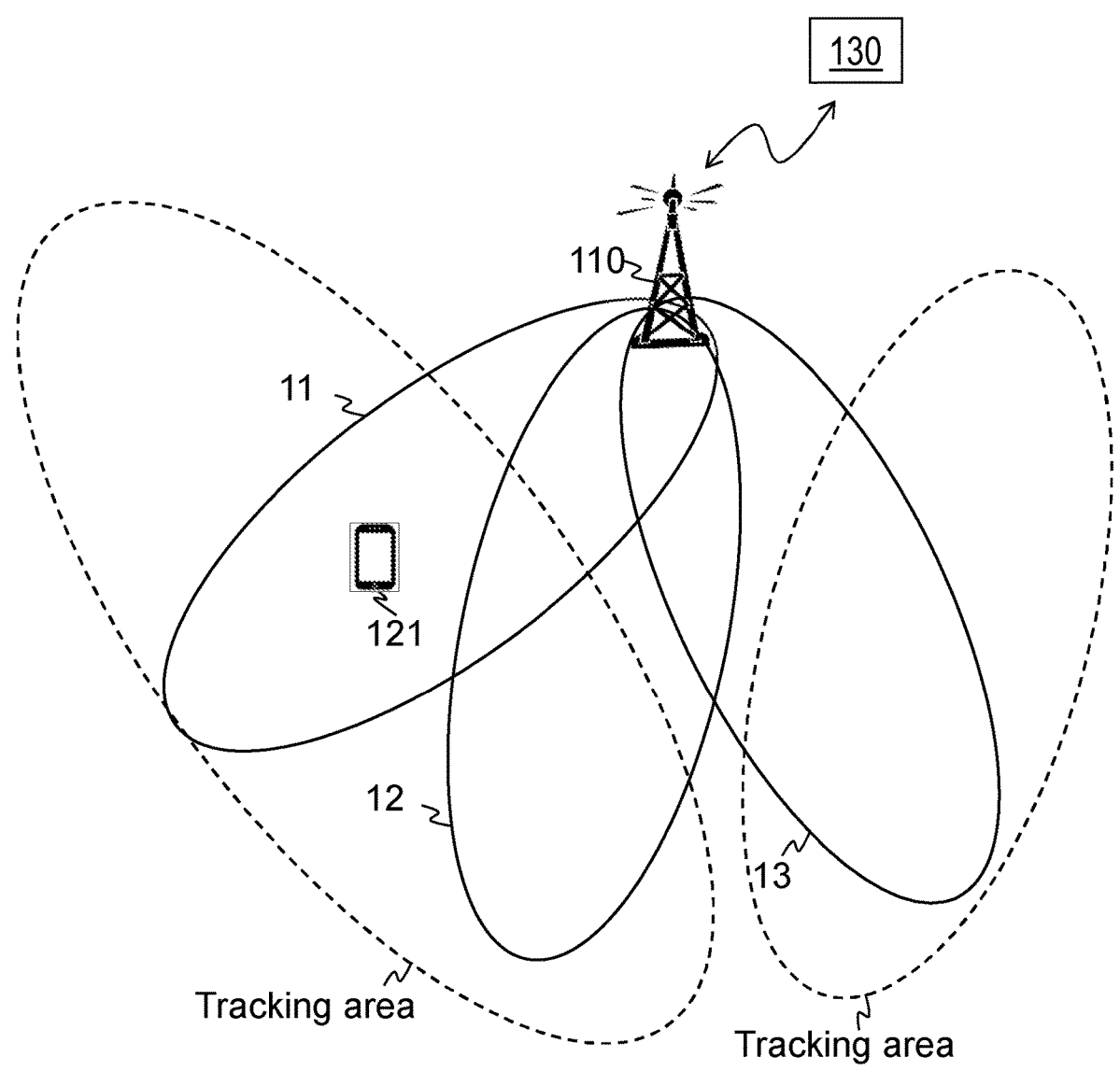
FIG. 2 is a schematic block diagram illustrating embodiments of a wireless communications network.

FIG. 2 shows a part of the wireless communications network 100 according to an example scenario wherein embodiments herein may be applied. The first cell 11 and the second cell 12 belongs to the same tracking area. The third cell 13 belongs to different tracking area. The UE 121 is located in the first cell 11. The UE 121 is configured to use a first timer value related to a first time interval to be used between subsequent signaled updates of the location of the UE 121 to the network node 110, 130 in a TAU procedure.

According to embodiments herein the UE 121, when determined to be stationary, will be configured with a second timer value related to a second time interval to be used between subsequent signaled updates of the location of the UE 121. By configuring the UE 121 with the second timer value when the UE 121 is determined to be stationary allows the network node 110, 130 and UE 121 to control a TAU procedure.

The method according to embodiments will now be described from the view of the network node 110, 130 together with FIG. 3.

Example embodiments of a method performed by a network node 110, 130 for controlling a TAU procedure of the UE 121 in the wireless communications network 100 will now be described with reference to a flowchart depicted in FIG. 3. The TAU procedure is to signal subsequent updates of the location of the UE 121 to the network node 110, 130. The UE 121 is configured with a first timer value relating to a first time interval to be used between subsequent signaled updates of the location of the UE 121 in the TAU procedure.

The network node 110, 130 may be represented by any one out of a core network node 130 and a base station 110. The base station 110 may be a RAN network node and the core network node 130 may be a CN network node.

The method comprises the following actions, which actions may be taken in any suitable order. Actions that are optional are presented in dashed boxes in FIG. 3.

Action 301

A UE, such as the UE 121, is stationary when it remains in the same location.

The network node 110, 130 determines that the UE 121 is stationary, when the UE 121 has remained in the same tracking area for a period of time that exceeds a first threshold.

The UE 121 may report two types of location to the network such as the RAN or the CN. The first type is used during a TAU procedure, where the UE reports its location in terms of Tracking Area Code (TAC) identity to the CN, such as e.g. a core network node. The TAC identity identifies a Tracking Area, which does not represent a geographical location, but rather is composed of a group of cells. Such location may be used when a paging message is sent to the UE 121. The second type is when the UE 121 reports its geographical location to the RAN, such as a base station.

For the first type of location, it is the CN that determines whether or not the UE 121 is stationary, based on whether the UE 121 is changing its location and is moving to another tracking area. Whereas for the second type of location, it is the RAN that takes the decision on whether the UE 121 is stationary or not.

When there is a change in UE 121 status, from stationary to non-stationary and vice versa, being detected by either a network node 110 in the RAN, such as a base station or a network node 130 in the CN, such as a core network node, then the network node that has detected that change, may notify the other network node, such as the network node 110 in the RAN or the network node 130 in the CN, about the change of location of the UE 121.

The delay in reacting to the change of the UE's 121 status from stationary to non-stationary and vice versa depends on whether it is the network node 110 in the RAN or whether the it is a network node 130 in the CN that has detected such location change.

In a first scenario, suppose that it is the network node 130 in the CN that has determined that the UE 121 has become stationary, e.g. after the UE 121 has stayed in the same tracking area for a predetermined period of time. The UE 121 may be configured to signal updates of its location e.g. every 1 hour, in a TAU procedure, and the UE 121 may further be determined to be stationary when it has remained in the same tracking area for a period of time the exceeds e.g. 5 hours. In such a scenario, it may take at least 5 hours for the UE 121 to be determined to be stationary after entering a tracking area.

In a second scenario, suppose that the network node 110 in the RAN that has determined that the UE 121 has changed its location. In such scenario, the reaction to the change of location is immediate. In this scenario the UE 121 may report a change of location, e.g. via a Radio Resource Configuration (RRC) protocol message, 3GPP specification 36.331. The report may comprise a new parameter indicating that the UE 121 has changed its location. The network node 110 in RAN may track the location of the UE 121, either by calculating the geographical location of the UE 121, or by the UE 121 calculating its geographical location which may be signaled to the network node in RAN.

Example of the first threshold may be e.g. three hours.

This action relates to Actions S10 and S100 that are described below.

Action 302

When determined that the UE 121 is stationary, the network node 110, 130 configures the UE 121 with a second timer value. The second timer value is related to a second time interval to be used between subsequent signaled updates of the location of the UE 121 in the TAU procedure. The time interval of the second timer value is a time period longer than the time interval of the first timer value. E.g., in order for the network node 110, 130 to keep track of the location of the UE 121, the UE 121 is configured to periodically trigger TAU procedures to signal an update to its location to the network node 110, 130 according to the configured timer. For the UE 121 that is stationary, the need for frequent location updates is less than for a non-stationary UE. With a longer time interval between the subsequent location updates in a the TAU procedure, signaling load will be reduced, which results in an increased performance of the wireless communications network 100.

A TAU procedure, when used herein, means messages comprising updates of the location of the UE 121 that are signaled to the network node 110, 130. The messages are signaled to the network node 110, 130 subsequently according the timer value the UE 121 is configured with, where the timer value is related to a time interval. The location may indicate the tracking area where the UE 121 is currently located. The message may comprise a TAC identity to identify said tracking area.

An example of the time interval of the first timer value may be e.g. 1 hours.

An example of the time interval of the second timer value being a time period longer than the time interval of the first timer value may be e.g. 5 hours.

This action relates to Actions S11 and S100 that are described below.

Action 303

A UE, such as the UE 121, that is determined to be stationary, and thus configured with the second timer value, may at some point change its location.

E.g. in some embodiments, when determined that the UE 121 is stationary, the network node 110, 130 configures the UE 121 to report to the network node 110, 130 when the UE (121) changes its location.

The configuration may be sent to the UE 121 in an RRC Reconfiguration message.

Configuring the UE 121 to report to the network node 110, 130, when the UE 121 changes its location may comprise configuring the UE 121 to any one out of: Refrain from determining or reporting a change of location of the UE 121, determining a change of location of the UE 121 and reporting the change of location to the network node 110, 130 at the time of detection, or determining a change of location of the UE 121 and reporting the change of location when the UE 121 has stopped moving. The configuration of the UE 121 to report when it changes location may differ depending on the capabilities of the UE 121. A UE, such as the UE 121, with low capabilities, e.g. a low complexity UE such as an MTC UE or a NB-IoT UE, may have limited processing capabilities and being able to track its own movements, while a normal UE may be equipped with satellite positioning or have processing capabilities to calculate its location by other means, e.g. OTDOA.

The configuration may comprise a parameter and the value of the parameter may decide how the UE 121 is configured to report to the network node 110, 130.

This action relates to Action S20 that is described below.

Action 304

When the UE 121 changes its location it may report it to the network node 110, 130.

In some embodiments, the network node 110, 130 determines that the UE 121 has changed its location, based on a report received from the UE 121. The report may be received from the UE 121 in e.g. a RRC Measurement Report. The RRC Measurement Report may be received during a TAU procedure. The report may comprise a parameter indicating whether or not that UE 121 has changed its location.

Determining that the UE 121 has changed its location may further comprise that the network node 110, 130 is starting to track the location of the UE 121.

As mentioned above, when there is a change in UE 121 status, from stationary to non-stationary and vice versa, being detected by either a network node 110 in the RAN, such as a base station or a network node 130 in the CN, such as a core network node, then the network node that has detected that change, may notify the other network node, such as the network node 110 in the RAN or the network node 130 in the CN, about the change of location of the UE 121. For example, if the network node 130 in the CN determines that the UE 121 has remained in the same tracking area for a period of time that exceeds a threshold, then in addition to considering the UE 121 as a stationary UE and take the necessary action, it may also indicate to the network node 110 in the RAN that the UE 121 is stationary. Similarly, if the network node 110 in the RAN determines that a stationary UE has changed its location, then not only the network node 110 in the RAN may take the necessary actions on for the UE 121, but it may also indicate to the network node 130 in the CN about the change in location.

As mentioned above, the delay in reacting to the change of the UE's 121 status from stationary to non-stationary and vice versa depends on whether it is the network node 110 in the RAN or whether the it is a network node 130 in the CN that has detected such location change.

In a first scenario, suppose that it is the network node 130 in the CN that has determined that the UE 121 has become stationary, e.g. after the UE 121 has stayed in the same tracking area for a predetermined period of time. The UE 121 may be configured to signal updates of its location e.g. every 1 hour, in a TAU procedure, and the UE 121 may further be determined to be stationary when it has remained in the same tracking area for a period of time the exceeds e.g. 5 hours. In such a scenario, it may take at least 5 hours for the UE 121 to be determined to be stationary after entering a tracking area.

In a second scenario, suppose that the network node 110 in the RAN that has determined that the UE 121 has changed its location. In such scenario, the reaction to the change of location is immediate. In this scenario the UE 121 may report a change of location, e.g. via a RRC protocol message, 3GPP specification 36.331. The report may comprise a new parameter indicating that the UE 121 has changed its location. The network node 110 in RAN may track the location of the UE 121, either by calculating the geographical location of the UE 121, or by the UE 121 calculating its geographical location which may be signaled to the network node in RAN.

This action relates to Actions S210, S211 and S220 that are described below.

Action 305

E.g. in order to keep track of the location of the UE 121 that operates in idle mode, the network node 110, 130 may obtain the UE's location through signaled location updates from the UE 121 in the TAU procedure.

In some embodiments, when the UE 121 operates in idle mode, the network node 110, 130 configures the UE 121 to use the first timer value relating to the first time interval between subsequent signaled updates of the location of the UE 121 in the TAU procedure. E.g., each time the UE 121 triggers the TAU procedure and signals an update of the location of the UE 121, the network node 110, 130 may obtain the location of the UE 121. The location of the UE 121 may be obtained by the network node 110, 130 calculating the location by e.g. OTDOA. The network node 110, 130 may further obtain the location of the UE 121 by receiving it from the UE 121 that signals its location, e.g. when the UE 121 is equipped with GPS.

When the UE 121 operates in a connected mode, the network node 110, 130 may periodically obtain the location of the UE 121. Obtaining the location of the UE 121 may comprise any one out of calculating the location of the UE 121 by e.g. OTDOA, and periodically receiving location updates calculated by the UE 121, e.g. GPS coordinates.

This action relates to Action S211 that is described below.

Action 306

At some point in time, the UE 121 that changes it location will stop moving. E.g. in order for the network node 110, 130 to know when the UE 121 becomes stationary, the network node 110, 130 needs to determine the time the UE stays in the same tracking area once it has stopped moving.

In some embodiments, the network node 110, 130 may determine that the UE 121 is stationary, when the UE 121 has remained in the same tracking area for a period of time that exceeds a second threshold.

As mentioned above, when there is a change in UE 121 status, from stationary to non-stationary and vice versa, being detected by either a network node 110 in the RAN, such as a base station or a network node 130 in the CN, such as a core network node, then the network node that has detected that change, may notify the other network node, such as the network node 110 in the RAN or the network node 130 in the CN, about the change of location of the UE 121.

The second threshold may be different than the first threshold or it may be the same.

Example of the second threshold may be e.g. 2 hours.

Action 307

As mentioned above, the network node 110, 130 may determine for how long time the UE 121 stays in the same tracking area once it has stopped moving to know when it is stationary.

In some embodiments, the network node 110, 130 determines that the UE 121 is non-stationary, when the UE 121 has remained in the same tracking area for a period of time that is below or equal to the second threshold. As long as the UE 121 has not been determined to be stationary, the network node 110, 130 may keep tracking the UE 121 and subsequently determine whether it stationary or not.

Action 308

As mentioned above, the need for frequent location updates is less for a stationary than for a non-stationary UE.

Therefore, in some embodiments, when determined that the UE 121 is stationary, the network node 110, 130 configures the UE 121 to use the second timer value relating to the second time interval between subsequent signaled updates of the location of the UE 121 in the TAU procedure.

The longer time interval between the subsequent location updates in the TAU procedure when using the second timer interval, results in a reduced signaling load will and an increased performance of the wireless communications network 100.

Action 309

When the network node 110, 130 has determined the UE 121 to be stationary and configured the UE with the second timer value as described in Actions 301 and 302 above, the frequency of signaled location updates from the UE 121 will be less. E.g. if the UE 121 operates in connected mode frequently, the network node 110, 130 will be able to determine changes of location of the UE 121 without configuring the UE 121 to report it.

The network node 110, 130 may have a stored timing advance value of the UE 121. This may be to estimate the distance of the UE 121 from the antennas of the network node 110, 130. As the timing advance is always used in every communication in order to synchronize uplink and downlink subframes and as one may directly estimate from the value of the timing advance how far the UE 121 is from the antennas of the network node 110, 130.

In some embodiments, when the UE 121 operates in connected mode, the network node 110, 130 calculates a current timing advance value for the UE 121. This may be to keep track of movements or changes of location of the UE 121. If the value of timing advance increase then that means the UE 121 is moving away from the network node 110, 130. On the contrary, if the timing advance decreases then the UE 121 is moving towards the network node 110, 130. when the timing advance remains at the same within a threshold, then the network node 110, 130 may determine that UE 121 it is a stationary.

The current timing advance value may be calculated e.g. every time the UE 121 operates in a connected mode. To reduce processing load in the network node 110, 130, the current timing advance value of the UE 121 may be calculated less frequently, such as e.g. every second or third time the UE 121 operates in a connected mode, or with any other periodicity determined by the network node 110, 130.

This action relates to Actions IS3 and S31 that are described below.

Action 310

In order to determine when the UE 121 changes it location, the network node 110, 130 may need to compare the current timing advance value with the stored timing advance value.

So, in some embodiments, the network node 110, 130 determines that the UE 121 has changed its location when the difference between the stored timing advance value and the current timing advance value exceeds a third threshold.

The network node 110, 130 may store the current timing advance value when determined that the UE 121 has changed its location.

Example of the third threshold may be e.g. a value corresponding to change of location of 78.12 meters which corresponds to one unit of timing advance.

As mentioned above, when there is a change in UE 121 status, from stationary to non-stationary and vice versa, being detected by either a network node 110 in the RAN, such as a base station or a network node 130 in the CN, such as a core network node, then the network node that has detected that change, may notify the other network node, such as the network node 110 in the RAN or the network node 130 in the CN, about the change of location of the UE 121.

This action relates to Action S33 that is described below.

Action 311

In some embodiments, when determined that the UE 121 has changed its location, the network node 110, 130 tracks the location of the UE 121. As mentioned above, the network node 110, 130 may track the location of the UE 121 by calculating the location by e.g. OTDOA.

Tracking the location of the UE 121 may further comprise calculating the current timing advance value of the UE 121 and determine whether or not the UE 121 has further changed its location by comparing the current timing advance value and the stored timing advance value. When the difference between the current timing advance value and the stored timing advance value is above exceeds the third threshold, the network node 110, 130 determines that the UE 121 has further changed its location and stores the current timing advance value.

This action relates to Action S33 that is described below.

Action 312

At some point in time, the UE 121 that changes it location may stop moving. The network node 110, 130 may need to determine that the UE 121, has stopped moving in order to know when the UE 121 becomes stationary.

In some embodiments, the network node 110, 130 determines that the UE 121 has not changed its location when the difference between the current timing advance value and the stored timing advance value is below or equal to the third threshold. Determining that the UE 121 has not changed its location, e.g. allows the network node 110, 130 to check whether the UE 121 is stationary.

This action relates to Action S32 that is described below.

Action 313

In order for the network node 110, 130 to know when the UE 121 becomes stationary, the network node 110, 130 may need to determine the time the UE stays in the same location.

E.g. therefore, in some embodiments, the network node 110, 130 determines that the UE 121 is stationary, when the difference between the stored timing advance value and the current timing advance value is below or equal to the third threshold for a period of time that exceeds the second threshold.

When determined that the UE 121 is stationary, the network node 110, 130 may stop tracking the location of UE 121.

The second threshold may be different than the first threshold or it may be the same.

As mentioned above, when there is a change in UE 121 status, from stationary to non-stationary and vice versa, being detected by either a network node 110 in the RAN, such as a base station or a network node 130 in the CN, such as a core network node, then the network node that has detected that change, may notify the other network node, such as the network node 110 in the RAN or the network node 130 in the CN, about the change of location of the UE 121.

This action relates to Action S33 that is described below.

The method according to embodiments will now be described from the view of the UE 121 together with FIGS. 4*a-c*.

Example embodiments of a method performed by a UE 121 for controlling a TAU procedure of the UE 121 in the wireless communications network 100 will now be described with reference to a flowchart depicted in FIG. 4*a-c*. The TAU procedure is to signal subsequent updates of the location of the UE 121 to the network node 110, 130. The UE 121 is configured with the first timer value relating to the first time interval to be used between subsequent signaled updates of the location of the UE 121 in the TAU procedure.

The method comprises the following actions, which actions may be taken in any suitable order. Actions that are optional are presented in dashed boxes in FIG. 4*a-c*.

Action 401

Figure 4A:
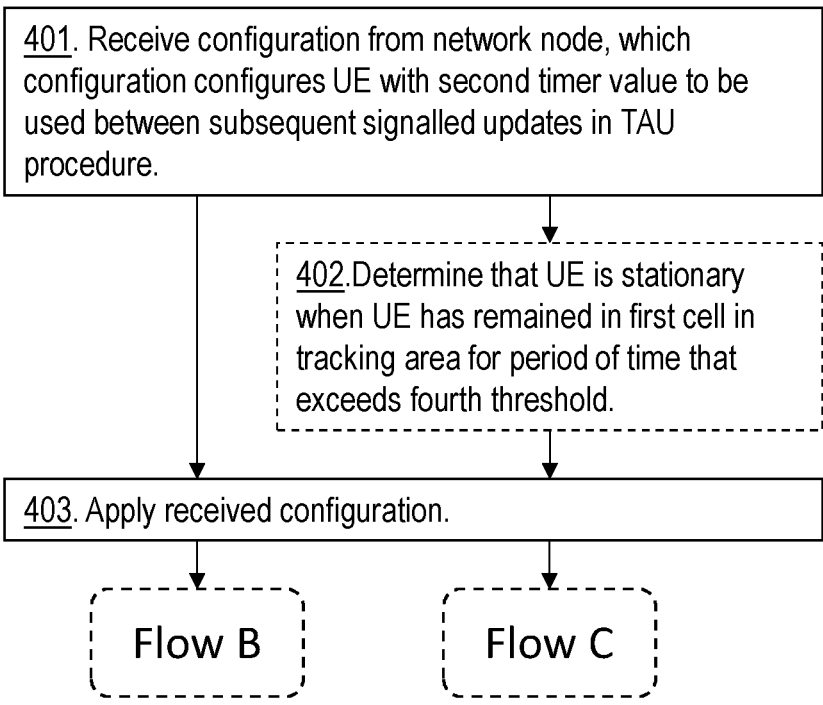
FIGS. 4a, b and c are flowcharts depicting embodiments of a method in a UE.

Now referring to example embodiments depicted in FIG. 4*a*. E.g., to be able to adapt the frequency of subsequent signaled location updates to a network node, such as the network node 110, 130, the UE 110 will be configured with more than one timer interval to use for the subsequent signaled updates.

The UE 121 receives a configuration from the network node 110, 130. The configuration configures the UE 121 with the second timer value. The second timer value is related to the second time interval to be used between subsequent signaled updates of the location of the UE 121 in the TAU procedure. The time interval of second timer value is a time period longer than the time interval of the first timer value.

As mentioned above, a TAU procedure, when used herein, means messages comprising updates of the location of the UE 121 that are signaled to the network node 110, 130. The messages are signaled to the network node 110, 130 subsequently according the timer value the UE 121 is configured with, where the timer value is related to a time interval. The location may indicate the tracking area where the UE 121 is currently located. The message may comprise a TAC identity to identify said tracking area.

The configuration may be received from the network node 110, 130 in an accept message in the TAU procedure.

The UE 121 may report two types of location to the network such as the RAN or the CN. The first type is used during a TAU procedure, where the UE reports its location in terms of TAC identity to the CN, such as e.g. a core network node. The TAC identity identifies a Tracking Area, which does not represent a geographical location, but rather is composed of a group of cells. Such location may be used when a paging message is sent to the UE 121. The second type is when the UE 121 reports its geographical location to the RAN, such as a base station.

For the first type of location, it is the CN that determines whether or not the UE 121 is stationary, based on whether the UE 121 is changing its location and is moving to another tracking area. Whereas for the second type of location, it is the RAN that takes the decision on whether the UE 121 is stationary or not.

The delay in reacting to the change of the UE's 121 status from stationary to non-stationary and vice versa depends on whether it is the network node 110 in the RAN or whether the it is a network node 130 in the CN that has detected such location change.

In a first scenario, suppose that it is the network node 130 in the CN that has determined that the UE 121 has become stationary, e.g. after the UE 121 has stayed in the same tracking area for a predetermined period of time. The UE 121 may be configured to signal updates of its location e.g. every 1 hour, in a TAU procedure, and the UE 121 may further be determined to be stationary when it has remained in the same tracking area for a period of time the exceeds e.g. 5 hours. In such a scenario, it may take at least 5 hours for the UE 121 to be determined to be stationary after entering a tracking area.

In a second scenario, suppose that the network node 110 in the RAN that has determined that the UE 121 has changed its location. In such scenario, the reaction to the change of location is immediate. In this scenario the UE 121 may report a change of location, e.g. via a RRC protocol message, 3GPP specification 36.331. The report may comprise a new parameter indicating that the UE 121 has changed its location. The network node 110 in RAN may track the location of the UE 121, either by calculating the geographical location of the UE 121, or by the UE 121 calculating its geographical location which may be signaled to the network node in RAN.

Action 402

In some embodiments, the UE 121 determines that the UE 121 is stationary. The UE 121 is determined to be stationary when the UE 121 has remained in a first cell 11 in a tracking area for a period of time that exceeds a fourth threshold. Determining that the UE 121 is stationary causes the UE 121 to apply a configuration configuring the UE 121 to use the second timer value relating to the second time interval between subsequent signaled updates of the location of the UE 121 in the TAU procedure. When Action 402 is performed, the UE 121 may perform the Actions according to Flow C depicted in FIG. 4*c*.

An example of the fourth threshold may be 3 hours.

The fourth threshold may be different than the first threshold or second threshold, or it may be the same as any one or both of the first and second threshold.

This action relates to Action S100 that is described below.

Action 403

When determined that the UE (121) is stationary, the UE 121 applies the received configuration, to use the second timer value relating to the second time interval between subsequent signaled updates of the location of the UE 121 in the TAU procedure.

As mentioned above, with a longer time interval between the subsequent location updates in a the TAU procedure, signaling load will be reduced, which results in an increased performance of the wireless communications network 100.

When the UE 121 has applied the configuration to use the second timer value relating to the second time interval between subsequent signaled updates of the location of the UE 121 in the TAU procedure, the UE 121 may perform Actions according to any one out of Flow B or Flow C. Actions according to Flow B is depicted in FIG. 4*b* and relates to embodiments wherein the UE 121 is configured to determine any change of location and report it to the network node 110, 130. Actions according to Flow C is depicted in FIG. 4C and relates to embodiments wherein the UE 121 tracks its location and performs actions based on whether it remains in the same tracking area or not.

This action relates to Actions S11 and S100 that is described below.

Action 404

Figure 4B:
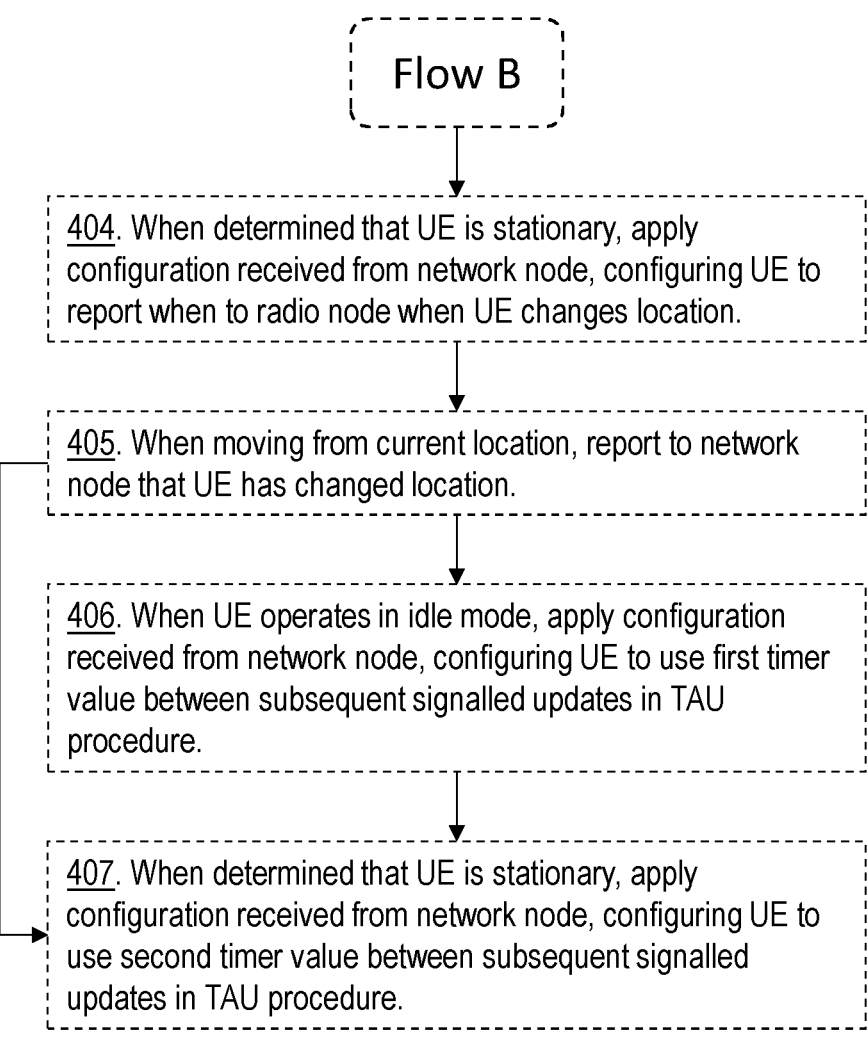

Now referring to example embodiments depicted in FIG. 4*b*. When the UE 121 has applied the configuration to use the second timer interval, the time between the subsequent signaled location updates to the network node 110, 130 will be longer than before applying the configuration. In order for the network node 110, 130 to be aware of any changes of location for the UE 121, the UE 121 may need to report it to the network node 110, 130.

Therefore, in some embodiments, when determined that the UE 121 is stationary, the UE 121 applies a configuration, received from the network node 110, 130, configuring the UE 121 to report to the network node 110, 130 when the UE 121 changes its location. The configuration may be received from the network node 110, 130 in a RRC Reconfiguration message.

The applied configuration configuring the UE 121 to report to the network node 110, 130 when the UE 121 changes its location may comprise any one out of: Refraining from determining or reporting a change of location of the UE 121, determining a change of location of the UE 121 and reporting the change of location to the network node 110, 130 at the time of detection, or determining a change of location of the UE 121 and reporting the change of location when the UE 121 has stopped moving.

As mentioned above, the configuration of the UE 121 to report when it changes location may differ depending on the capabilities of the UE 121. The UE 121 when having low capabilities, e.g. a low complexity UE such as an MTC UE or a NB-IoT UE, may have limited processing capabilities and being able to track its own movements, while a normal UE may be equipped with satellite positioning or have processing capabilities to calculate its location by other means, e.g. radio fingerprint.

The configuration may comprise a parameter and the value of the parameter may decide how the UE 121 is configured to report to the network node 110, 130.

As mentioned above, the delay in reacting to the change of the UE's 121 status from stationary to non-stationary and vice versa depends on whether it is the network node 110 in the RAN or whether the it is a network node 130 in the CN that has detected such location change.

In a first scenario, suppose that it is the network node 130 in the CN that has determined that the UE 121 has become stationary, e.g. after the UE 121 has stayed in the same tracking area for a predetermined period of time. The UE 121 may be configured to signal updates of its location e.g. every 1 hour, in a TAU procedure, and the UE 121 may further be determined to be stationary when it has remained in the same tracking area for a period of time the exceeds e.g. 5 hours. In such a scenario, it may take at least 5 hours for the UE 121 to be determined to be stationary after entering a tracking area.

In a second scenario, suppose that the network node 110 in the RAN that has determined that the UE 121 has changed its location. In such scenario, the reaction to the change of location is immediate. In this scenario the UE 121 may report a change of location, e.g. via a RRC protocol message, 3GPP specification 36.331. The report may comprise a new parameter indicating that the UE 121 has changed its location. The network node 110 in RAN may track the location of the UE 121, either by calculating the geographical location of the UE 121, or by the UE 121 calculating its geographical location which may be signaled to the network node in RAN.

This action relates to Action S20 that is described below.

Action 405

As mentioned above, the UE 121 may need to report that it has changed its location to the network node 110, 130.

In some embodiments, when moving from its current location, the UE 121 reports to the network node 110, 130, that the UE 121 has changed its location. The UE 121 may e.g. determine that it has changed its location, when moving from its current location. Determining a change of location may comprise any one or more out or: The UE 121 being equipped with a movement detection tool, using a satellite positioning system, changing location from a serving cell to a non-serving cell, using radio fingerprints, and using Receiving (Rx)-Transmitting (Tx) time differences.

The report may be sent to the network node 110, 130 in e.g. a RRC Measurement Report. The report may comprise a parameter indicating whether or not that UE 121 has changed its location. When the UE 121 operates in idle mode, determining that the UE 121 has changed its location may trigger the UE 121 to report that it has changed its location during a TAU procedure.

When the UE 121 is configured to report to the network node 110, 130 that it has changed its location when it has stopped moving, the UE 121 may, when moving from its current location, track its movement in order to determine when it has stopped changing its location.

As mentioned above, The UE 121 may report two types of location to the network such as the RAN or the CN. The first type is used during a TAU procedure, where the UE reports its location in terms of TAC identity to the CN, such as e.g. a core network node. The TAC identity identifies a Tracking Area, which does not represent a geographical location, but rather is composed of a group of cells. Such location may be used when a paging message is sent to the UE 121. The second type is when the UE 121 reports its geographical location to the RAN, such as a base station.

For the first type of location, it is the CN that determines whether or not the UE 121 is stationary, based on whether the UE 121 is changing its location and is moving to another tracking area. Whereas for the second type of location, it is the RAN that takes the decision on whether the UE 121 is stationary or not.

This action relates to Action S21 that is described below.

Action 406

In order to keep track of the location of the UE 121 when the UE 121 operates in idle mode, the network node 110, 130 may obtain the location of the UE 121 through signaled location updates from the UE in the TAU procedure.

So, e.g. in in some embodiments, when the UE 121 operates in idle mode, the UE 121 applying a configuration, received from the network node 110, 130. The configuration configures the UE 121 to use the first timer value relating to the first time interval between subsequent signaled updates of the location of the UE 121 in the TAU procedure.

The configuration to use the first timer value may be received from the network node 110, 130 in an accept message in the TAU procedure.

This action relates to Action S211 that is described below.

Action 407

The UE 121 may need to be configured by the network node 110, 130 in order to start using the second timer value once the UE 121 has stopped changing its location.

In some embodiments, when determined that the UE 121 is stationary, the UE 121 applies a configuration, received from the network node 110, 130. The configuration configures the UE 121 to use the second timer value relating to the second time interval between subsequent signaled updates of the location of the UE 121 in the TAU procedure.

The configuration to use the second timer value may be received from the network node 110, 130 in an accept message in the TAU procedure.

Action 408

Now referring to example embodiments depicted in FIG. 4c. After the UE 121 has applied the received configuration to use the second timer interval according to Action 403 above, the UE 121 may change its location. The UE 121 may need to know if it has remained in the same tracking area in order to take appropriate actions.

In some embodiments, in response to the UE 121 changing its location, the UE 121 determines whether or not the UE 121 remains in the same tracking area.

Action 409

When the UE 121 moves to a new tracking area, it may be triggered to signal an update of its location of the network node 110, 130.

E.g. therefore, when determined that the UE 121 has not remained in the same tracking area, the UE 121 triggers a TAU procedure, causing the UE 121 to apply a configuration configuring the UE 121 to use the first timer value. The first timer value relates to the first time interval between subsequent signaled updates of the location of the UE 121 in the TAU procedure. The first timer value relating to the first time interval between subsequent signaled updates, will then be used until it is determined that UE 121 is stationary.

The triggered TAU procedure may be a different TAU procedure than the TAU procedure related to the configured timer value. The triggered TAU procedure may comprise a location update signaled to the network node 110, 130, where the signaled location update is not related to the configured timer value.

This action relates to Action S101 that is described below.

Action 410

A tracking area may comprise more than one cell. It may be possible for the UE 121 to move from one cell to another and still remain in the same tracking area.

When the UE 121 moves within the same tracking area, different actions may be performed by the UE 121.

So, in some embodiments, when determined that the UE 121 has remained in the same tracking area, the UE 121 may perform any one out of a first action and a second action. The first action and second action are related to triggering a TAU procedure.

The first action may be to trigger a TAU procedure to signal updates of the location of the UE 121 to the network node 110, 130, and the second action may be to, based on a prediction of any further changes of location refrain from triggering a TAU procedure related to a configured timer value.

This action relates to Action S102 that is described below.

Action 411

Action 411 is related to the first action mentioned above.

As mentioned above, the tracking area may comprise more than one cell. It may be possible for the UE 121 to move from one cell to another and still remain in the same tracking area.

In some embodiments, when the UE 121 has changed location from the first cell 11 to a second cell 12, which second cell 12 belongs to the same tracking area as the first cell 11, the UE 121 triggers a TAU procedure. The triggering the TAU procedure causes the UE 121 to apply a configuration configuring the UE 121 to use the first timer value. The first timer value is relating to the first time interval between subsequent signaled updates of the location of the UE (121) in the TAU procedure. The first timer value relating to the first time interval between subsequent signaled updates, may then be used until it is determined that UE 121 is stationary.

As mentioned above, the triggered TAU procedure may be a different TAU procedure than the TAU procedure related to the configured timer value. The triggered TAU procedure may comprise a location update signaled to the network node 110, 130, where the signaled location update is not related to the configured timer value.

This action relates to Action S102 that is described below.

Action 412

Action 412 is related to the second action mentioned above.

The UE 121 may keep moving after it is determined that it has changed its location and eventually enter new tracking area. If the UE 121 is aware of historical data related to its movements, the UE 121 may predict any further changes of location.

In some embodiments, the UE 121 predicts, based on historical data, that the UE 121 will further change its location, and not remain in the same tracking area, within a period of time that is below a sixth threshold. Historical data may comprise data related to e.g. movement of the UE 121, duration of time the UE 121 has remained in different locations, the cell and tracking area related to the different locations and time of the day that the UE 121 has remained at the different locations.

The predicting may comprise any one out of: The UE 121 has changed its location within the first cell 11 and is predicted to further changes its location to a third cell 13, which third cell 13 belongs to different tracking area than the first cell 11, or the UE 121 has changed its location from the first cell 11 to the second cell 12, and is predicted to further changes its location to the third cell 13, which second cell 12 belongs to same tracking area as the first cell 11 and which third cell 13 belongs to a different tracking area than the first cell 11.

An example of the sixth threshold may be 5 minutes.

This action relates to Action S102 that is described below.

Action 413

Action 413 is related to the second action mentioned above.

E.g. in order to utilize the result of the prediction, the UE 121 may need to refrain from any upcoming TAU procedure. E.g. therefore, the UE 121 may configure the UE 121 to refrain from triggering an upcoming TAU procedure related to a configured timer value.

This may reduce the load in the wireless communications network 100, since an unnecessary signaled location update is avoided.

This action relates to Action S102 that is described below.

Action 414

Action 414 is related to the second action mentioned above.

As mentioned above, the UE 121 may have predicted that it would further change its location and not remain in the same tracking area. Arriving in a new tracking area may trigger the UE 121 to signal an update of its location of the network node 110, 130.

In some embodiments, when the UE 121 has further changed its location and is not remaining in the same tracking area, the UE 121 triggers a TAU procedure causing the UE 121 to apply a configuration. The configuration configures the UE 121 to use the first timer value relating to the first time interval between subsequent signaled updates of the location of the UE 121 in the TAU procedure. The first timer value relating to the first time interval between subsequent signaled updates, may be used until it is determined that UE 121 is stationary.

As mentioned above, the triggered TAU procedure may be a different TAU procedure than the TAU procedure related to the configured timer value. The triggered TAU procedure may comprise a location update signaled to the network node 110, 130, where the signaled location update is not related to the configured timer value.

This action relates to Action S102 that is described below.

Action 415

As mentioned above, for the UE 121 that is stationary, the need for frequent location updates may be less than for a non-stationary UE.

Therefore, in some embodiments, when the UE 121 has stopped moving, the UE 121 may determine that the UE 121 is stationary, when the UE 121 has remained in the same cell 11, 12, 13 in a tracking area for a period of time that exceeds a fifth threshold. Determining that the UE 121 is stationary may cause the UE 121 to apply a configuration configuring the UE 121 to use the second timer value relating to the second time interval between subsequent signaled updates of the location of the UE 121 in the TAU procedure.

The fifth threshold may be different or the same as any one or more of the first, second and fourth thresholds.

As mentioned above, with a longer time interval between the subsequent location updates in a the TAU procedure, signaling load will be reduced, which results in an increased performance of the wireless communications network 100.

An example of the fifth threshold may be 3 hours.

This action relates to Action S103 that is described below.

Embodiments mentioned above will now be further described and exemplified. The text below is applicable to and may be combined with any suitable embodiment described above.

Actions IS1 and S10-S11 are related to Method 1 depicted in FIG. 5a,

Actions IS1-1 and S100-103 are related to Method 1-1 depicted in FIG. 5b, Actions IS2 and S20-S22, S210-S211 and S220 are related to Method 2, 2-1 and 2-2 depicted in FIG. 5c, Actions IS3 and S30-S33 are related to Method 3 depicted in FIG. 5d.

These methods depict examples of detailed actions according to embodiments herein. In the FIGS. 5a-d the network node 110, 130 is referred to as network or network node and the UE 121 is referred to as UE.

The actions may be taken in any suitable order. Some actions are new according to embodiments herein and are marked so, and some steps are performed according prior art.

In the below examples, six embodiments of methods are described.

A first method, Method 1, comprises actions performed by the network, such as the network node 110, 130, to control a TAU procedure.

A second method, Method 1-1, comprises actions performed by the UE, such as the UE 121, to control a TAU procedure.

A third, fourth and fifth method, Method 2, Method 2-1 and Method 2-2, comprises actions performed by the network, such as the network node 110, 130, and the UE, such as the UE 121, to control a TAU procedure.

A sixth method, Method 3, comprises actions performed by the network, such as the network node 110, 130, to control a TAU procedure.

Actions IS1 and S10-S11 are related to an example of Method 1 and will be described below. See FIG. 5a.

Action IS1

All UEs, such as e.g. the UE 121, in the wireless communications network are using the same periodic T3412 timer value, such as e.g. the first timer value, which usually is around 1 hour. As a consequence, every UE, such as e.g. the UE 121, in the network will trigger a periodic TAU procedure every 1 hour.

Action S10

Action S10 may comprise two sub-actions, Action S10-1 and Action S10-2.

Action S10-1: The network node 110, 130, selects UEs that are stationary, such as e.g. the UE 121, in a tracking area. The UE 121 is determined to be stationary by the network node 110, 130, when it remains in the same tracking area for period of time that exceeds a threshold, e.g. the first threshold, such as e.g. two weeks or one month, or even longer. These time periods are only considered as examples, and other periods, shorter or longer, are also possible.

Action S10-2: The network node 110, 130, may estimates the location of the UE 121 that is determined to be stationary. This may be done as follows:

The network node 110, 130 may calculate the location of the UE 121 during the periodic TAU procedure, e.g. via OTDOA. This may be applied for all UEs, in particular for low complex UEs which may not equipped with GPS. Or, the UE 121 may report its location during the periodic TAU procedure. This may be applied if it is possible for the UE 121 to calculate its location, e.g. if the UE 121 is equipped with GPS.

This action relates to Action 301 that is described above.

Action S11:

After selecting the UE 121, that is determined to be stationary, the network node 110, 130 allocates, such as configures, the T3412 extended value, such as e.g. the second timer value, to the UE 121, whereas e.g. for all other UEs the default T3412 timer value will be allocated. Note that based on NAS standards the T3412 timer value and T3412 extended timer value are sent to the UE 121, in the same NAS message, e.g. the TAU Accept message during a TAU procedure.

This action relates to Actions 302 and 403 that are described above.

Actions IS1-1 and S100-S104 are related to Method 1-1 and will be described below. See FIG. 5b.

Action IS 1-1

The UE 121 in the wireless communications network may receive from the network node 110, 130 the T3412 timer value, such as e.g. the first timer value, and T3412 extended value, such as e.g. the second timer value, in a TAU Accept message.

Action S100

The UE 121 when being non-stationary, may remain in the same location, e.g. a serving cell, cell1, such as e.g. the first cell 11, in a tracking area, for a predefined period of time, such as a period of time exceeding the fourth threshold. This may mean e.g. the UE 121 is staying for many hours in office or at home during night. Then the UE 121 may start using, such as apply the configuration configuring the UE 121 to use the T3412 extended value, such as e.g. the second timer value, from the next periodic TAU occurrence. As long as the UE 121 is located in cell1, such as e.g. the first cell 11, which indirectly means the UE 121 remains in the same tracking area, then the UE 121 may use the T3412 extended timer value, such as e.g. the second timer value.

For such feature to be performed the UE 121 may need to be equipped with a new software entity. The software entity may, such as the UE 121 may be configured to, check how long the UE 121 stay in the same cell and how often, e.g. daily or weekly or randomly. Then the UE 121 may take the best decision on whether to use the T3412 timer value, such as e.g. the first timer value, or the T3412 extended timer value, such as e.g. the second timer value.

This action relates to Actions 301, 302, 402 and 403 that are described above.

Action S101

If the UE 121 moves out of its current cell, such as e.g. the first cell 11, to another cell, cell3, such as e.g. the third cell 13, that belongs to different tracking area than the cell1, such as e.g. the first cell 11, then the UE 121 may trigger a TAU procedure.

This action relates to Action 409 that is described above.

Action S102

However, if the UE 121 moves out of its current cell, to another cell, cell2, such as e.g. the second cell 12, belonging to the same tracking area as the cell1, such as e.g. the first cell 11, then the UE 121 may perform one of the following actions:

First action: The UE 121 may trigger blindly a TAU procedure in order to notify the network node 110, 130 that it has moved from its last 'stationary' location that was in cell1, such as e.g. the first cell 11. In addition, the UE 121 may start using, such as applying a configuration configuring the UE 121 to use, the T3412 timer value, such as e.g. the first timer value, instead of T3412 extended timer value, such as e.g. the second timer value, for future periodic TAU triggering.

Second action: The UE 121 may be equipped with an artificial intelligent (AI) entity that predicts the UE 121 movement based on historical UE movement, such as e.g. historical data. The prediction may be able to tell whether it is worth triggering a periodic TAU procedure at cell2, such as e.g. the second cell 12, neighbor to cell1, such as e.g. the first cell 11, or rather wait until the UE 121 moves to another neighbor cell3, such as e.g. the third cell 13, that belongs to different tracking area than the cell 1, such as e.g. the first cell 11. In such scenario the UE 121 may be performing a standard TAU procedure anyway, i.e. signal an update of the location of the UE 121 to the network node 110, 130 since it changes its location to new tracking area. That way the UE 121 may save one unnecessary periodic TAU procedure.

In one example, suppose that the UE 121 is moving from cell1 such as e.g. the first cell 11 towards a cell3, such as e.g. the third cell 13, that belongs to different tracking area than the cell 1, such as e.g. the first cell 11 and that it will have its periodic timer, such as e.g. the first or second timer value, expiring in e.g. 3 minutes. Suppose that based on an AI algorithm the UE 121, will reach cell3, such as e.g. the third cell 13 either in 2 minutes, that is 1 minute before the periodic timer will expire, or in 4 minutes, that is 1 minute after the periodic timer, such as e.g. the first or second timer value, has expired.

In both cases, whether the UE 121 will reach cell3, such as e.g. the third cell 13, a few minutes before or after periodic timer, such as e.g. the first or second timer value, expires, the UE 121 may refrain from triggering the periodic TAU procedure, such as the TAU procedure related to the first or second timer value, and hence save one TAU triggering that will not bring any additional information. By introducing such AI entity in the UE 121 there is a new entity providing to make the network node 110, 130, and other network nodes, aware about the skipping of a TAU related to the periodic timer, such as e.g. the first or second timer value, whenever a TAU, such as e.g. triggered by moving to a new tracking area, is to occur few minutes before or after the periodic timer, such as e.g. the first or second timer value, expires.

This action relates to Actions 410, 411, 412, 412 and 413 that are described above.

Action S103

If the UE 121 remains in one cell, such as e.g. the same cell 11, 12, 13, for a predefined period of time, such as e.g. a time period exceeding the fifth threshold, then the UE 121 may start using, such as applying a configuration configuring the UE 121 to use, T3412 extended value, such as e.g. the second timer value.

This action relates to Action 415 that is described above.

Action IS2 is related to Method 2, Method 2-1 and Method 2-2 and will be described below. See FIG. 5c.

Action IS2

The UE 121 when being stationary may remain at the same location for long period of time and may be configured with the T3412 extended value, such as e.g. the second timer value.

Actions S20-S22 are related to Method 2 and will be described below. See FIG. 5c.

Action S20

In 3GPP standards, the UE 121 may not be configured to detect, e.g. determine, and report any move it made from its last fixed location. This comes from the fact that applying that for all UEs, such as e.g. the UE 121, is useless and harming to the network since it requires additional signaling and processing. However, when applying that only for UEs that are stationary, this becomes very useful and does not bring additional load and processing to the network.

Following are two procedures provided that may be used to configure the UE 121 when stationary to determine and possibly report any geographical move it made from its last known location.

First Procedure

The network node 110, 130 may send to the UE 121 determined to be stationary a new parameter, denoted e.g. 'detect & report when you move'. The parameter may be added to an existing RRC message, e.g. RRCConectionRe-configuration or via broadcasted system information. Such a parameter may be coded in e.g. two bits. Here is an example of these two bits:

When the parameter, e.g. detect & report when you move, is set to '00', the parameter may configure the UE 121 to not perform any detection or determination of UE movement, such as determine that the UE 121 has changed its location, nor any reporting to the network node 110, 130. Such value may e.g. be sent to the UE 121 that are determined to be non-stationary.

When the parameter, e.g. detect & report when you move, is set to '11', the parameter may configure the UE 121 to detect or determine any UE movement, such as determine that the UE 121 has changed its location. In addition the UE 121 may have to report such movements to the network node 110, 130 from the beginning, e.g. when the UE 121 determines it has changed it location. This so that the network node 110, 130 starts tracking the location of the UE 121 as long as it is moving. Such value may e.g. be sent only to the UE 121 that is determined to be stationary.

When the parameter, e.g. detect & report when you move, is set to '10', the parameter may configure the UE 121 to detect or determine any UE movement, such as determine that the UE 121 has changed its location. However the UE 121 does not have to report such movement to the network node 110, 130 from the beginning, e.g. when the UE 121 determines it has changed it location. This because the UE 121 may track its movement by itself. Such value may e.g. be sent only to the UE 121 that is determined to be stationary.

Second Procedure

The UE 121 may be equipped with a software entity that has the following role, such as e.g. the UE 121 is configured to: Any UE 121 that remains in the same location, such as e.g. in the same tracking area, the same cell, or the same exact location, for a predetermined period of time is considered as stationary. When the UE 121 moves from such location, e.g. changes its location, the UE 121 is configured to notify, e.g. report to, the network node 110, 130 about the move.

This action relates to Actions 303 and 404 that are described above.

Action S21

The UE 121 that is determined to be stationary may be configured to detect, e.g. determine, that it has changed its location, and report its movement to the network node 110, 130.

The UE 121 may be configured to:

Option 1: The UE 121 may be equipped with a physical tools that detect any movement, such as determine a change of location, e.g. an accelerometer, gyroscope etc. Based on any of these tools, the UE 121 may determine that is has moved from its last known location, such as e.g. changed its location, depending on the extent of the movement and may perform one of below two actions:

1) If the UE 121 has moved a distance that is below or equal to a predefined threshold, e.g. few centimeters, the UE 121, may refrain from send a notification, such as reporting the change of location, to the network node 110, 130.

2) If the UE 121 has moved a distance that exceeds a predefined threshold, the UE 121 may send a notification, such as reporting the change of location, to the network node 110, 130.

Option 2: The UE 121 may be equipped with e.g. a GPS or other positioning tools. The UE 121 may periodically calculates its actual location and then compares it with the last calculated location. If they are the same then no action is taken by the 121. Otherwise the UE 121 may send a notification, such as reporting the change of location, to the network node 110, 130 indicating that the UE 121 has moved, e.g. changed its location.

Option 3: When the UE 121 moves, such as changing its location, form its serving cell to a new cell, it may send a notification, such as reports the change of location, to the network node 110, 130 indicating a change of location.

Option 4: The UE 121, may periodically calculate and store its radio fingerprint. With each new radio fingerprint, it may compare the latest one with the previous one. If similar then no action is taken, otherwise the UE 121 may send a notification, such as report the change of location, to the network node 110, 130 about a change of location.

Option 5: With every call the UE 121 may compare its actual Rx-Tx timing difference with a stored Rx-Tx value. If the difference exceeds a predefined threshold, the UE 121 may determine that it has changed its location. Otherwise, if the difference between the actual Rx-Tx and the stored Rx-Tx is below or equal to the predefined threshold, the UE 121 may determine that it has not changed its location and no further action is performed by the UE 121. The UE 121 Rx-Tx method may be useful for a UE 121 that performs frequent calls. However, it may not be practical for a UE 121 that performs calls less frequently, e.g. any type of sensor that has to report a certain value if ever the measurement has exceeded a predefined threshold.

Action S22

When the UE 121 that is determined to be stationary has moved, such as changed its location, two methods, Method 2-1 and Method 2-2 may be performed in order to track the UE 121 movement until it settles in a new stationary location.

Actions S210-S211 are related to Method 2-1 and will be described below. See FIG. 5c.

Action S210

The UE 121 determined to be stationary may send a notification to, such as report, the network node 110, 130 about the start of any movement it had made since its last stationary location, e.g. that it has changed its location. For that purpose, the UE 121 may send a new parameter, e.g. denoted 'UE has moved' and coded in 1 bit. When set to e.g. '1', the parameter may indicate that the UE 121 has changed its location. When set to e.g. 'O' the parameter may indicate that the UE 121 have not changed its location. The parameter may be added to any uplink RRC message, e.g. RRC Measurement Report.

If the UE 121 determined to be stationary operates in connected mode when it has detected its movement, e.g. determined that it has changed its location, it may send 'UE has moved' set to e.g. '1' in an RRC Measurement report.

If the UE 121 determined to be stationary operates in idle mode when it has detected its movement, e.g. determined that it has changed its location, the UE 121 may to trigger a TAU procedure and during that procedure it may send 'UE has moved' set to e.g. '1' in e.g. an RRC Measurement report.

This action relates to Action 304 that is described above.

Action S211

After being notified by, e.g. receiving a report from, the UE 121, the network node 110, 130 may determine that the UE 121 has changed its location. The network node 110, 130 may track the movement of the UE 121.

When the network node 110, 130 receives 'UE has moved' set to e.g. 1, it performs following actions depending on whether the UE 121 operates in idle or in connected mode.

If the UE 121 operates in idle mode and a TAU procedure was triggered, the network node 110, 130 may send in TAU Accept message the T3412 timer value such as e.g. the first timer value, so that the UE 121 may continue to trigger the TAU procedure, e.g. signal subsequent updates of the location of the UE 121 with short periodicity. Then, during each periodic TAU procedure, either the network node 110, 130, based on the receipt of 'UE has moved' set to 1 in e.g. an RRC message, may calculate the UE 121, location, e.g. via any prior art method such as e.g. OTDOA. Or UE 121 may periodically send its location, e.g. calculated by the UE 121 using e.g. GPS.

If the UE 121 operates in connected mode, either the network node 110, 130 may periodically calculate UE 121 location, e.g. via any prior art method such as e.g. OTDOA, or the UE 121 may periodically send its location, e.g. calculated by the UE 121 using e.g. GPS.

The network node 110, 130 may continue tracking the UE 121 location until the UE 121 has settled at a new fixed location, such as has stopped changing its location. In addition, the network node 110, 130 may configure the UE 121 with the T3412 extended value, such as e.g. the second timer value, after confirming the UE 121 has settled at its new location, e.g. determined that the UE 121 is stationary for a predefined period of time, such as e.g. a time period that exceeds the second threshold.

This action relates to Action 305 and 406 that are described above.

Action S220 is related to Method 2-2 and will be described below. See FIG. 5*c*.

Action S220

When the UE 121 is aware that it has moved from its current location, such as determined that it has changed it location, the UE 121 may then perform two actions.

The UE 121 starts tracking its own location. The objective is not to draw a trajectory of the UE 121 movement, but rather it is to know when the UE 121 has settled at a final new fixed location, such as determined that it has stopped changing its location.

The UE 121 does not notify, e.g. report to, the network node 110, 130 when the UE 121 changes it location. In other words, the UE 121 will not send 'UE has moved' set to 1 or the geographical coordinates of its final location until the location tracking is completed, that is the UE 121 has settled at a new location, such as determined that it has stopped changing its location.

The tracking of the UE 121 depends on the tools that the UE 121 is using.

Once the UE 121 confirms that it has settled in one new location, e.g. determines that it has stopped changing location, it may report to the network node 110, 130 that the UE 121 has stopped moving. This could be done by sending the parameter 'UE has moved' set to 0.

The UE 121 may send to the network node 110, 130 the geographical coordinates of its new settled location. In case this is not done, the network node 110, 130 may calculate the location.

This action relates to Action 304 that is described above.

Action IS3 and S30-S33 Method 3 and will be described below. See FIG. 5*d*.

Action IS3

The network node 110, 130 may have stored a list of UEs determined to be stationary, such as e.g. including the UE 121, and the network node 110, 130 may further have stored the timing advance of each stationary UE 121.

Action S30

Among the UE such as the UE 121, that are determined to be stationary, the network node 110, 130 may select those who perform frequent calls. E.g. a smart fire alarm does not perform frequent calls, however a smart stationary sensor in factory might be very active in calls. The network node 110, 130 may obtain information about a UE such as the UE 121 that perform frequent calls based on data collected from e.g. a core network node, e.g. average number of calls for each UE in one hour or from an Operating Support System (OSS) where Key Performance Indicators (KPI) are reported periodically by network nodes periodically.

Action S31

The network node 110, 130 may continuously compare timing advance values of the frequent call UE 121 determined to be stationary.

For each UE 121 that makes frequent calls, the network node 110, 130 may calculate the timing advance of the UE 121 and store it in its database.

This action relates to Action 309 that is described above.

Action S32-S33 relates to determining whether or not the UE 121 has changed its location. Every predefined number of calls, it may be one or more calls, the network node 110, 130 may compare the latest calculated timing advance value (TA_actual), with the last stored timing advance value (TA_stored).

Action S32

If TA_actual has not changed by a certain predefined threshold from TA_stored, e.g. the difference is below or equal to the third threshold, the network node 110, 130 may consider that the UE 121 did not move from its current location and no further action is taken by the network node 110, 130.

This action relates to Action 312 that is described above.

Action S33

If TA_actual has changed by a certain predefined threshold from TA_stored e.g. the difference exceeds the third threshold, the network node 110, 130 may consider that the UE 121 has moved from its stationary location, e.g. changed its location, and then it start tracking the location of the UE 121 until the UE 121 settles in a new stationary location.

This action relates to Actions 310, 311 and 313 that are described above.

Figure 6A:
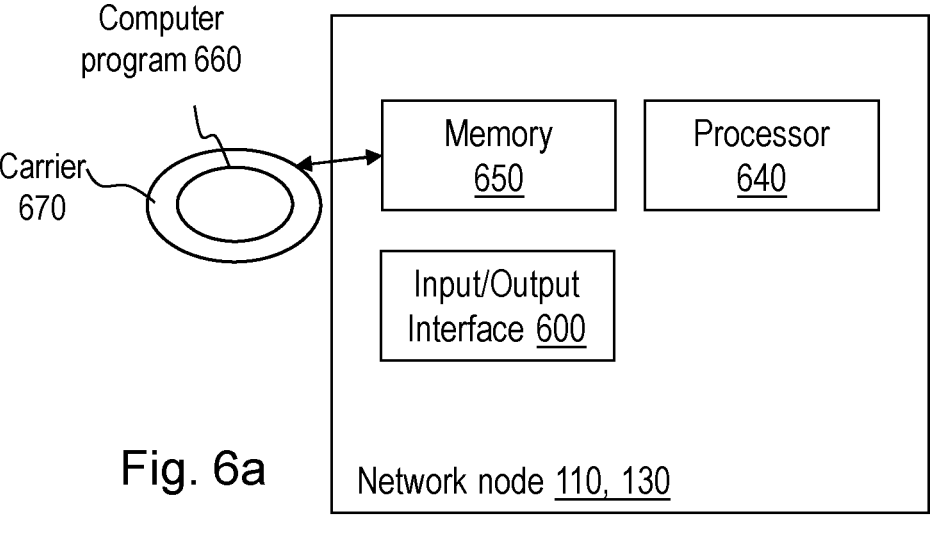
FIGS. 6a and b are schematic block diagrams illustrating embodiments of a network node.
Figure 6B:
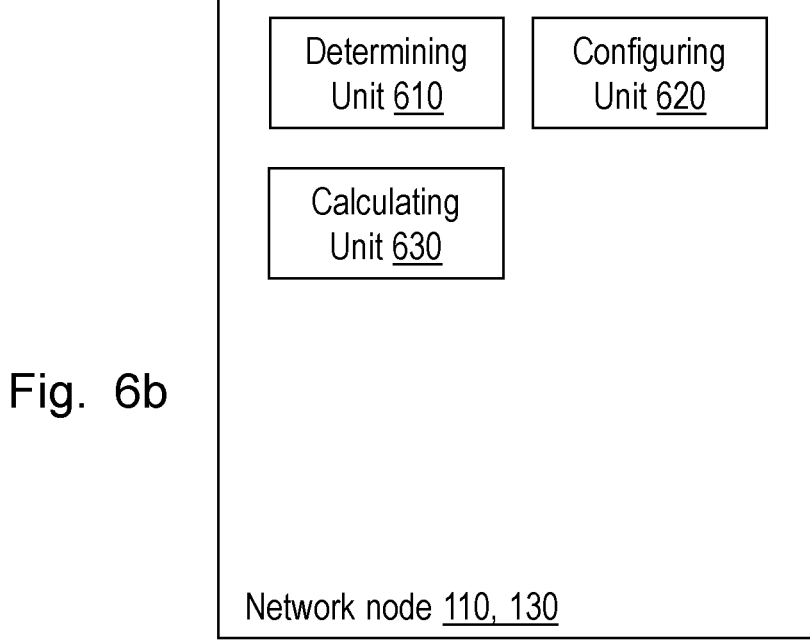

To perform the method actions, the network node 110, 130 may comprise an arrangement depicted in FIGS. 6*a* and *b*. The network node 110, 130 is configured to control a TAU procedure of the UE 121 in the wireless communications network 100. The TAU procedure is to signal subsequent updates of the location of the UE 121 to the network node 110, 130. The UE 121 is configured with a first timer value relating to a first time interval adapted to be used between subsequent signaled updates of the location of the UE 121 in the TAU procedure.

The network node 110, 130 may be adapted to have a stored timing advance value of the UE 121.

The network node 110, 130, 121 may comprise an input and output interface 600 configured to communicate with e.g. the UE 121 and with network nodes in the wireless communications network 100.

The network node 110, 130 is further configured to, e.g. by means of a determining unit 610 in the network node 110, 130, determine that the UE 121 is stationary, when the UE 121 has remained in the same tracking area for a period of time that exceeds a first threshold The network node 110, 130 may further be configured to, e.g. by means of the determining unit 610 in the network node 110, 130, determine that the UE 121 has changed its location, based on a report received from the UE 121.

The network node 110, 130 may further be configured to, e.g. by means of the determining unit 610 in the network node 110, 130, determine that the UE 121 is stationary, when the UE 121 has remained in the same tracking area for a period of time that exceeds a second threshold, and The network node 110, 130 may further be configured to, e.g. by means of the determining unit 610 in the network node 110, 130, determine that the UE 121 is non-stationary, when the UE 121 has remained in the same tracking area for a period of time that is below or equal to the second threshold.

The network node 110, 130 may further be configured to, e.g. by means of the determining unit 610 in the network node 110, 130, determine that the UE 121 has changed its location by further start tracking the location of the UE 121.

The network node 110, 130 may further be configured to, e.g. by means of the determining unit 610 in the network node 110, 130, determine that the UE 121 has changed its location when the difference between the stored timing advance value and the current timing advance value exceeds a third threshold. When determined that the UE 121 has changed its location, the network node 110, 130 may track the location of the UE 121.

The network node 110, 130 may further be configured to, e.g. by means of the determining unit 610 in the network node 110, 130, determine that the UE 121 has not changed its location when the difference between the current timing advance value and the stored timing advance value is below or equal to the third threshold.

The network node 110, 130 may further be configured to, e.g. by means of the determining unit 610 in the network node 110, 130, determining that the UE 121 is stationary, when the difference between the stored timing advance value and the current timing advance value is below or equal to the third threshold for a period of time that exceeds the second threshold.

The network node 110, 130 is further configured to, e.g. by means of a configuring unit 620 in the network node 110, 130, when determined that the UE 121 is stationary, configure the UE 121 with a second timer value relating to a second time interval. The second timer value is adapted to be used between subsequent signaled updates of the location of the UE 121 in the TAU procedure. The time interval of second timer value is adapted to be a time period longer than the time interval of the first timer value.

The network node 110, 130 may further be configured to, e.g. by means of the configuring unit 620 in the network node 110, 130, when determined that the UE 121 is stationary, configure the UE 121 to report to the network node 110, 130 when the UE 121 changes its location, The network node 110, 130 may further be configured to, e.g. by means of the configuring unit 620 in the network node 110, 130, to configure the UE 121 to report to the network node 110, 130, when the UE 121 changes its location by further configuring the UE 121 to any one out of: Refrain from determine or report a change of location of the UE 121, determine a change of location of the UE 121 and report the change of location to the network node 110, 130 at the time of detection, or determine a change of location of the UE 121 and report the change of location when the UE 121 has stopped moving.

The network node 110, 130 may further be configured to, e.g. by means of the configuring unit 620 in the network node 110, 130, when the UE 121 operates in idle mode, configure the UE 121 to use the first timer value relating to the first time interval between subsequent signaled updates of the location of the UE 121 in the TAU procedure.

The network node 110, 130 may further be configured to, e.g. by means of the configuring unit 620 in the network node 110, 130, when determined that the UE 121 is stationary, configure the UE 121 to use the second timer value relating to the second time interval between subsequent signaled updates of the location of the UE 121 in the TAU procedure.

The network node 110, 130 may further be configured to, e.g. by means of a calculating unit 630 in the network node 110, 130, when the UE 121 operates in connected mode, calculate a current timing advance value for the UE 121.

The embodiments herein may be implemented through a respective processor or one or more processors, such as the processor 640 of a processing circuitry in the network node 110, 130 depicted in FIG. 6*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110, 130. One such carrier may be in the form of a CD ROM disc. It is however feasible with other data carriers such as a memory stick. The computer program code may furthermore be provided as pure program code on a server and downloaded to the network node 110, 130.

The network node 110, 130 may further comprise a memory 650 comprising one or more memory units. The memory 650 comprises instructions executable by the processor 640 in the network node 110, 130. The memory 650 is arranged to be used to store e.g. information, messages, indications, configurations, thresholds, timer values, reports, locations, tracking areas, timing advance values, communication data and applications to perform the methods herein when being executed in the network node 110, 130.

In some embodiments, a computer program 660 comprises instructions, which when executed by the respective at least one processor 640, cause the at least one processor 640 of the network node 110, 130 to perform the actions above.

In some embodiments, a respective carrier 670 comprises the respective computer program 660, wherein the carrier 670 is one of an electronic signal, an optical signal, an electromagnetic signal, a magnetic signal, an electric signal, a radio signal, a microwave signal, or a computer-readable storage medium.

Those skilled in the art will appreciate that the units in the network node 110, 130 described above may refer to a combination of analog and digital circuits, and/or one or more processors configured with software and/or firmware, e.g. stored in the network node 110, 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7A:
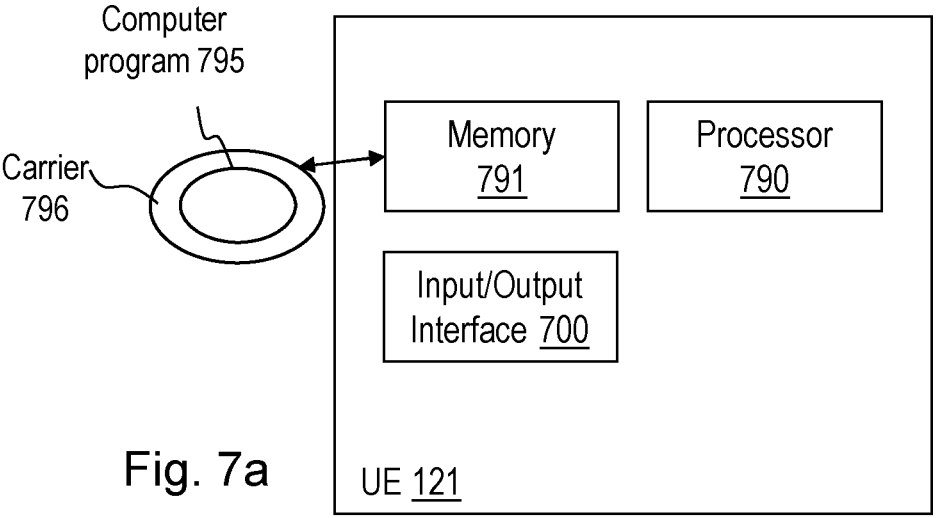
FIGS. 7a and b are schematic block diagrams illustrating embodiments of a UE.
Figure 7B:
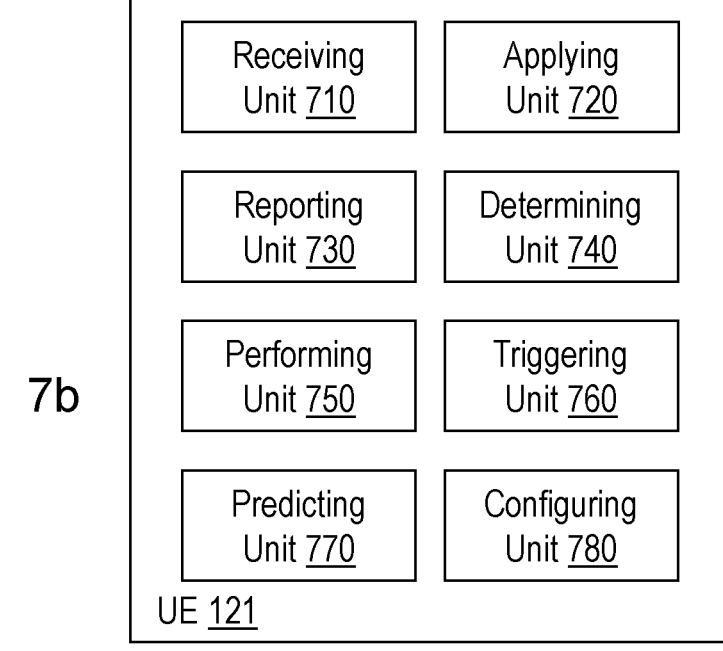

To perform the method actions, the network node 110, 130 may comprise an arrangement depicted in FIGS. 7*a* and *b*. The UE 121 is configured to control a TAU procedure of the UE 121 in a wireless communications network 100. The TAU procedure is to signal subsequent updates of the location of the UE 121 to the network node 110, 130. The UE 121 is configured with a first timer value relating to a first time interval adapted to be used between subsequent signaled updates of the location of the UE 121 in the TAU procedure.

The network node 110, 130, 121 may comprise an input and output interface 700 configured to communicate with e.g. the UE 121 and with network nodes in the wireless communications network 100.

The UE 121 is further configured to, e.g. by means of a receiving unit 710 in the UE 121, receive a configuration from the network node 110, 130. The configuration is adapted to configure the UE 121 with a second timer value relating to a second time interval to be used between subsequent signaled updates of the location of the UE (121) in the TAU procedure. The time interval of second timer value is adapted to be a time period longer than the time interval of the first timer value.

The UE 121 is further configured to, e.g. by means of an applying unit 720 in the UE 121, when determined that the UE 121 is stationary, apply the received configuration.

The UE 121 may further be configured to, e.g. by means of the applying unit 720 in the UE 121, when determined that the UE 121 is stationary, apply a configuration, received from the network node 110, 130. The configuration is adapted to configure the UE 121 to report to the network node 110, 130 when the UE 121 changes its location.

The applied configuration adapted to configure the UE 121 to report to the network node 110, 130 when the UE 121 changes its location may be adapted to comprise any one out of: Refrain from determining or reporting a change of location of the UE 121, determining a change of location of the UE 121 and reporting the change of location to the network node 110, 130 at the time of detection, or determining a change of location of the UE 121 and reporting the change of location when the UE 121 has stopped moving.

Determining a change of location is adapted to comprise any one or more out or: The UE 121 being equipped with a movement detection tool, using a satellite positioning system, changing location from a serving cell to a non-serving cell, using radio fingerprints, or using Rx-Tx time differences.

The UE 121 may further be configured to, e.g. by means of the applying unit 720 in the UE 121, when the UE 121 operates in idle mode, apply a configuration, received from the network node 110, 130. The configuration is adapted to configure the UE 121 to use the first timer value relating to the first time interval between subsequent signaled updates of the location of the UE 121 in the TAU procedure.

The UE 121 may further be configured to, e.g. by means of the applying unit 720 in the UE 121, when determined that the UE 121 is stationary, apply a configuration, received from the network node 110, 130. The configuration is adapted to configure the UE 121 to use the second timer value relating to the second time interval between subsequent signaled updates of the location of the UE 121 in the TAU procedure.

The UE 121 may further be configured to, e.g. by means of a reporting unit 730 in the UE 121, when moving from its current location, report to the network node 110, 130, that the UE 121 has changed its location.

The UE 121 may further be configured to, e.g. by means of a determining unit 740 in the UE 121, determine that the UE 121 is stationary, when the UE 121 has remained in a first cell 11 in a tracking area for a period of time that exceeds a fourth threshold. Determining that the UE 121 is stationary causes the UE 121 to apply a configuration adapted to configure the UE 121 to use the second timer value relating to the second time interval between subsequent signaled updates of the location of the UE 121 in the TAU procedure.

The UE 121 may further be configured to, e.g. by means of the determining unit 740 in the UE 121, in response to the UE 121 changing its location, determine whether or not the UE 121 remains in the same tracking area.

The UE 121 may further be configured to, e.g. by means of the determining unit 740 in the UE 121, when the UE 121 has stopped moving, determine that the UE 121 is stationary, when the UE 121 has remained in the same cell 11, 12, 13 in a tracking area for a period of time that exceeds a fifth threshold. Determining that the UE 121 is stationary causes the UE 121 to apply a configuration adapted to configure the UE 121 to use the second timer value relating to the second time interval between subsequent signaled updates of the location of the UE (121) in the TAU procedure.

The UE 121 may further be configured to, e.g. by means of a performing unit 750 in the UE 121, when determined that the UE 121 has remained in the same tracking area, perform any one out of a first action and a second action, which first action and second action are adapted to be related to triggering a TAU procedure.

The UE 121 may further be configured to, e.g. by means of a triggering unit 760 in the UE 121, when determined that the UE 121 has not remained in the same tracking area, trigger a TAU procedure causing the UE 121 to apply a configuration. The configuration is adapted to configure the UE 121 to use the first timer value relating to the first time interval between subsequent signaled updates of the location of the UE 121 in the TAU procedure.

The UE 121 may further be configured to, e.g. by means of the triggering unit 760 in the UE 121, when the UE 121 has changed location from the first cell 11 to the second cell 12, which second cell 12 is adapted to belong to the same tracking area as the first cell 11, trigger a TAU procedure causing the UE 121 to apply a configuration. The configuration is adapted to configure the UE 121 to use the first timer value relating to the first time interval between subsequent signaled updates of the location of the UE 121 in the TAU procedure.

The UE 121 may further be configured to, e.g. by means of the triggering unit 760 in the UE 121, when the UE 121 has further changed its location and is not remaining in the same tracking area, trigger a TAU procedure causing the UE 121 to apply a configuration. The configuration is adapted to configure the UE 121 to use the first timer value relating to the first time interval between subsequent signaled updates of the location of the UE 121 in the TAU procedure.

The UE 121 may further be configured to, e.g. by means of a predicting unit 770 in the UE 121, predict, based on historical data, that the UE 121 will further change its location, and not remain in the same tracking area, within a period of time that is below a sixth threshold.

The predicting is adapted to comprise any one out of: The UE 121 has changed its location within the first cell 11 and is predicted to further changes its location to a third cell 13, which third cell 13 is adapted to belong to different tracking area than the first cell 11, or the UE 121 has changed its location from the first cell 11 to the second cell 12, and is predicted to further changes its location to the third cell 13, which second cell 12 is adapted to belong to same tracking area as the first cell 11 and which third cell 13 is adapted to belong to a different tracking area than the first cell 11.

The UE 121 may further be configured to, e.g. by means of a configuring unit 780 in the UE 121, configure the UE 121 to refrain from triggering an upcoming TAU procedure adapted to be related to a configured timer value.

The embodiments herein may be implemented through a respective processor or one or more processors, such as the processor 790 of a processing circuitry in the network node 110, 130 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the network node 110, 130. One such carrier may be in the form of a CD ROM disc. It is however feasible with other data carriers such as a memory stick. The computer program code may furthermore be provided as pure program code on a server and downloaded to the network node 110, 130.

The network node 110, 130 may further comprise a memory 791 comprising one or more memory units. The memory 791 comprises instructions executable by the processor 790 in the network node 110, 130. The memory 791 is arranged to be used to store e.g. information, messages, indications, configurations, thresholds, timer values, reports, locations, tracking areas, timing advance values, communication data and applications to perform the methods herein when being executed in the network node 110, 130.

In some embodiments, a computer program 795 comprises instructions, which when executed by the respective at least one processor 790, cause the at least one processor 790 of the network node 110, 130 to perform the actions above.

In some embodiments, a respective carrier 796 comprises the respective computer program 795, wherein the carrier 796 is one of an electronic signal, an optical signal, an electromagnetic signal, a magnetic signal, an electric signal, a radio signal, a microwave signal, or a computer-readable storage medium.

Those skilled in the art will appreciate that the units in the network node 110, 130 described above may refer to a combination of analog and digital circuits, and/or one or more processors configured with software and/or firmware, e.g. stored in the network node 110, 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 8:
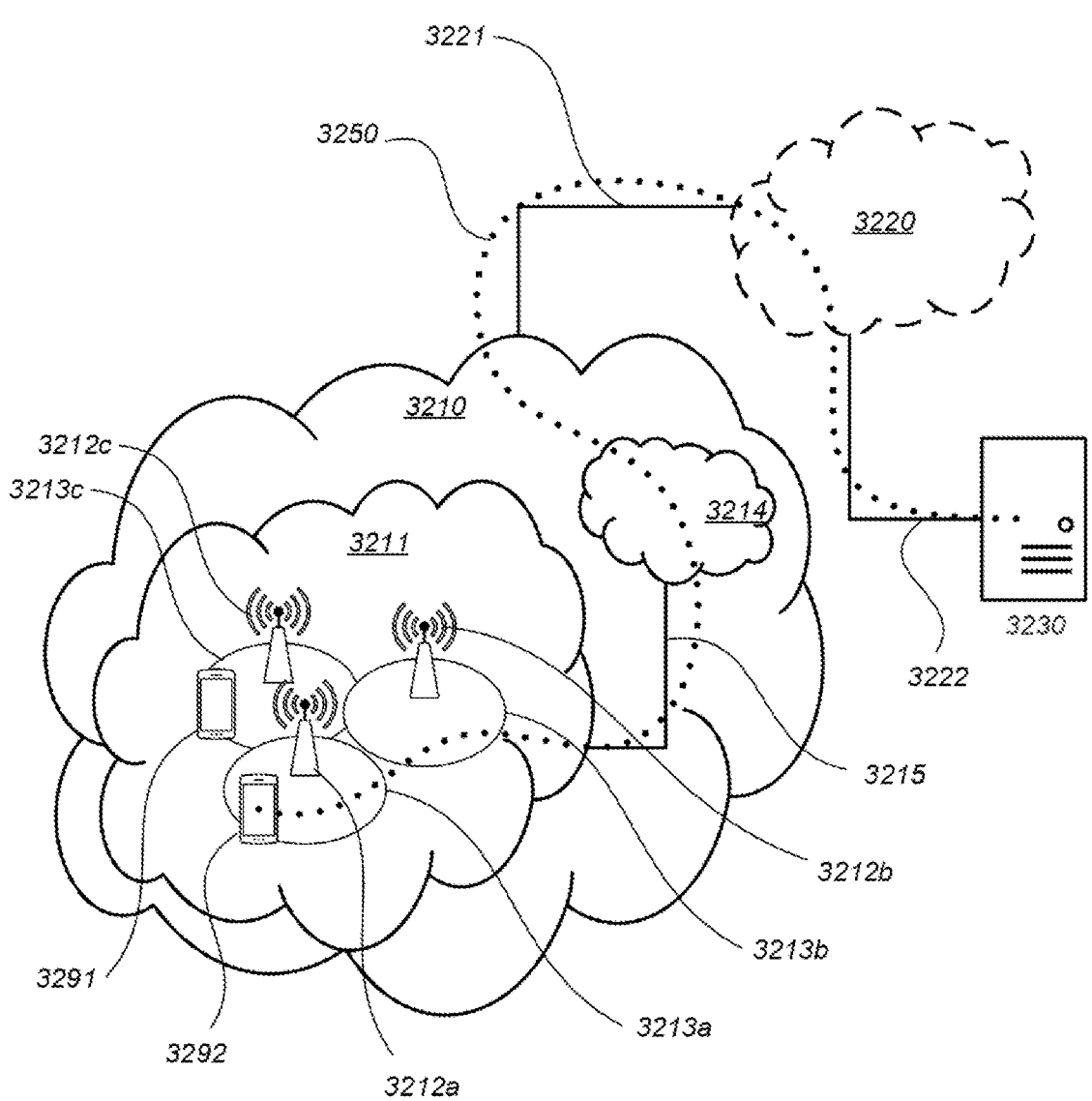
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, e.g. the network node 110, 130, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as the UE 121 and/or a Non-AP STA 3291 located in coverage area 3213c is configured to wirelessly connect to, or be paged by, the corresponding base station 3212c. A second UE 3292 such as the second UE 122 and/or a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to setup and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to setup and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

Figure 9:
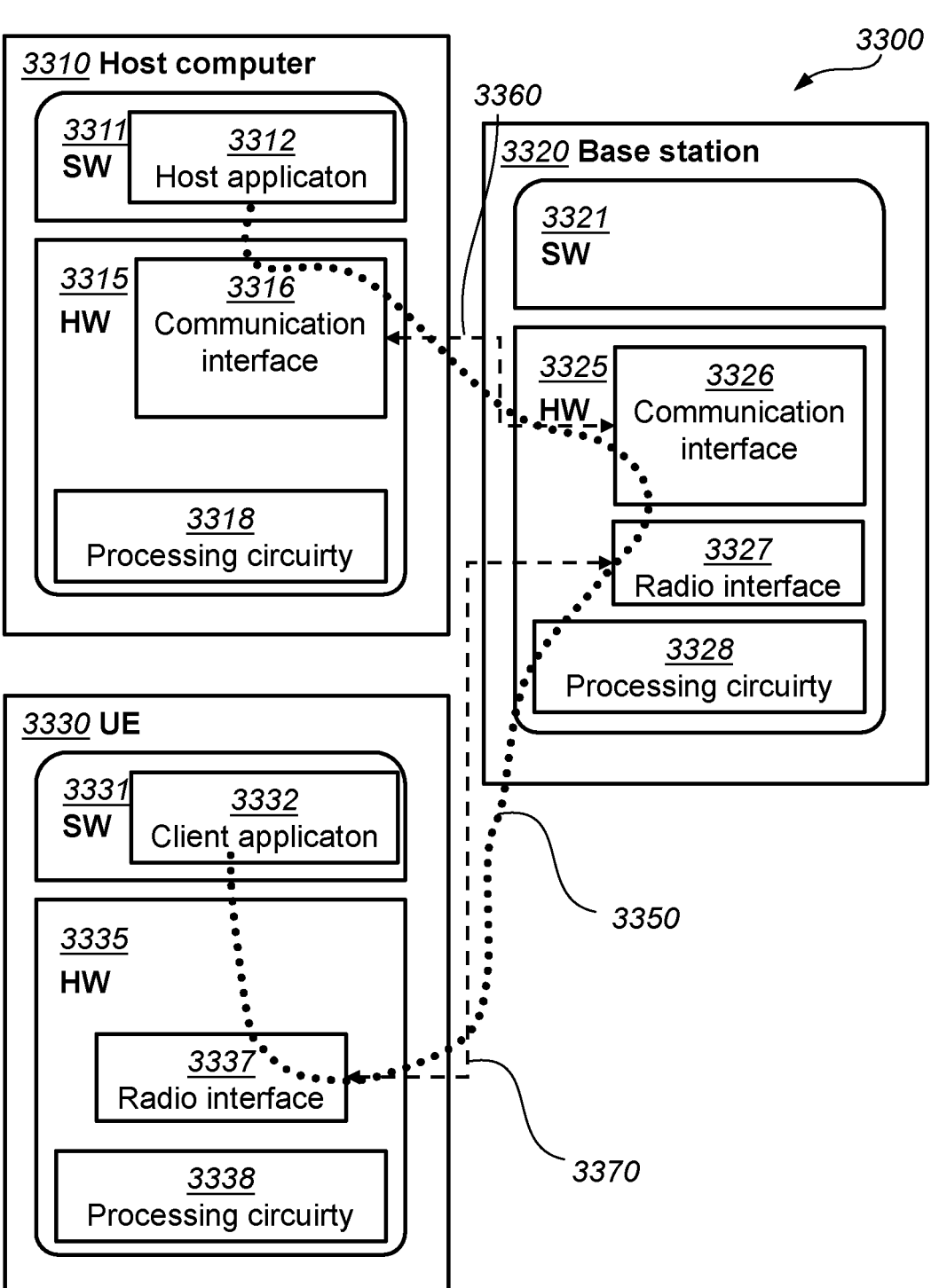
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 10, 11:
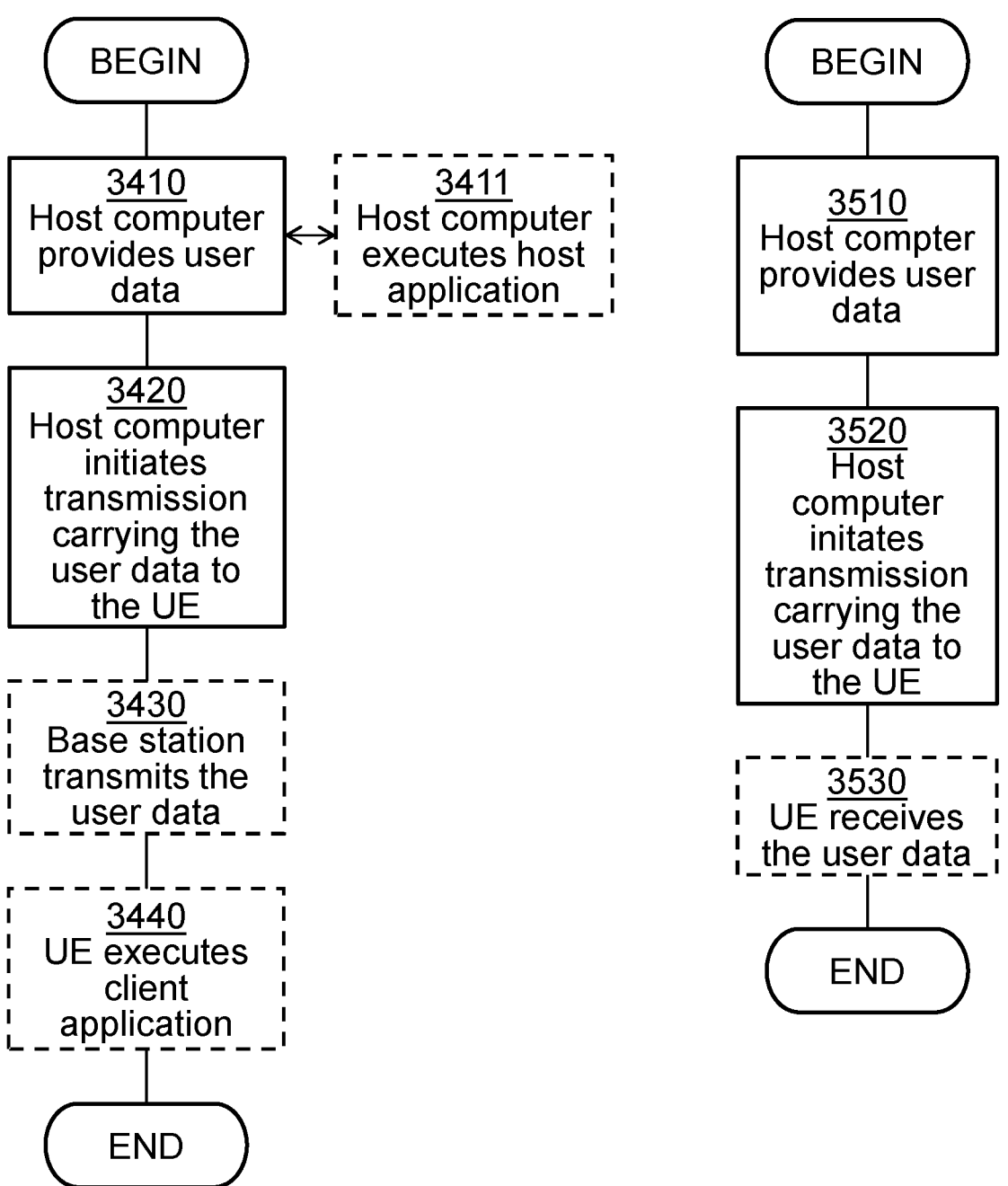
FIGS. 10 to 13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 12, 13:
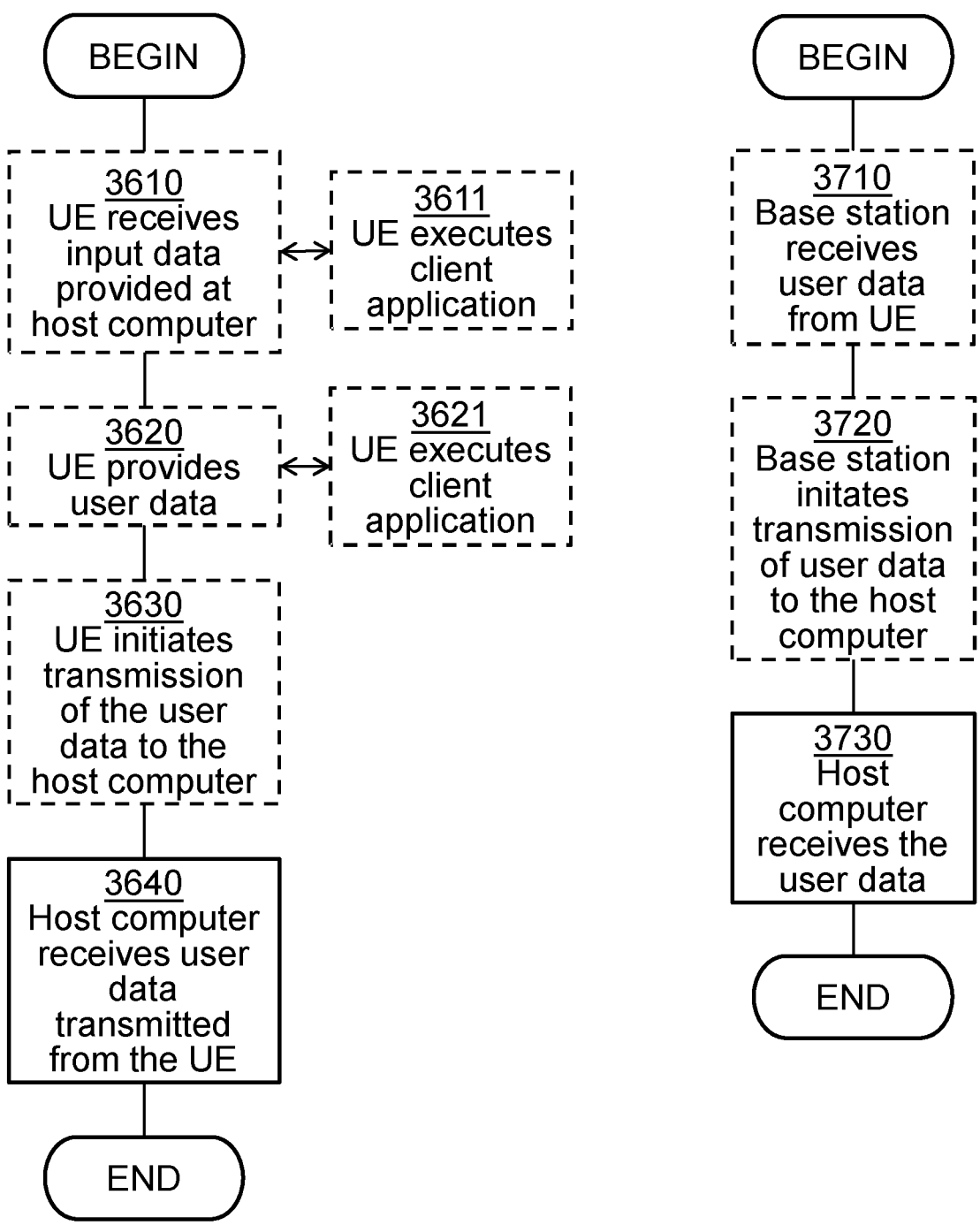

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first step 3610 of the method, the UE receives input data provided by the host computer. Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for controlling a Tracking Area Update, TAU, procedure of a User Equipment, UE, in a wireless communications network, which TAU procedure is to signal subsequent updates of the location of the UE to the network node, and which UE is configured with a first timer value relating to a first time interval to be used between subsequent signaled updates of the location of the UE in the TAU procedure, the method comprising:

storing a timing advance value of the UE;

determining that the UE is stationary, when the UE has remained in the same tracking area for a period of time that exceeds a first threshold;

when determined that the UE is stationary, configuring the UE with a second timer value relating to a second time interval to be used between subsequent signaled updates of the location of the UE in the TAU procedure, the time interval of second timer value being a time period longer than the time interval of the first timer value;

when the UE operates in connected mode, calculating a current timing advance value for the UE;

determining that the UE has changed its location when the difference between the stored timing advance value and the current timing advance value exceeds a third threshold, and when determined that the UE has changed its location, tracking the location of the UE;

determining that the UE has not changed its location when the difference between the current timing advance value and the stored timing advance value is below or equal to the third threshold; and determining that the UE is stationary, when the difference between the stored timing advance value and the current timing advance value is below or equal to the third threshold for a period of time that exceeds a second threshold.

2. The method according to claim 1, further comprising:

when determined that the UE is stationary, configuring the UE to report to the network node when the UE changes its location;

determining that the UE has changed its location, based on a report received from the UE;

determining that the UE (121) is stationary, when the UE has remained in the same tracking area for a period of time that exceeds the second threshold; and determining that the UE is non-stationary, when the UE has remained in the same tracking area for a period of time that is below or equal to the second threshold.

3. The method according to claim 2, wherein determining that the UE has changed its location further comprises start tracking the location of the UE, the method further comprising:

when the UE operates in idle mode, configuring the UE to use the first timer value relating to the first time interval between subsequent signaled updates of the location of the UE in the TAU procedure; and when determined that the UE is stationary, configuring the UE to use the second timer value relating to the second time interval between subsequent signaled updates of the location of the UE in the TAU procedure.

4. The method according to claim 2, wherein configuring the UE to report to the network node, when the UE changes its location comprises configuring the UE to any one out of:

refrain from determining or reporting a change of location of the UE;

determine a change of location of the UE and reporting the change of location to the network node at the time of detection; or determine a change of location of the UE and reporting the change of location when the UE has stopped moving.

5. A method performed by a User Equipment, UE, for controlling a Tracking Area Update, TAU, procedure of the UE in a wireless communications network, which TAU procedure is to signal subsequent updates of the location of the UE to the network node, and which UE is configured with a first timer value relating to a first time interval to be used between subsequent signaled updates of the location of the UE in the TAU procedure, the method comprising:

receiving a configuration from the network node, which configuration configures the UE with a second timer value relating to a second time interval to be used between subsequent signaled updates of the location of the UE in the TAU procedure, the time interval of second timer value being a time period longer than the time interval of the first timer value;

determining that the UE is stationary, when the UE has remained in a first cell in a tracking area for a period of time that exceeds a fourth threshold, causing the UE to apply a configuration configuring the UE to use the second timer value relating to the second time interval between subsequent signaled updates of the location of the UE in the TAU procedure;

when determined that the UE is stationary, applying the received configuration;

in response to the UE changing its location, determining whether or not the UE remains in the same tracking area;

when determined that the UE has remained in the same tracking area, performing any one out of a first action and a second action, which first action and second action are related to triggering a TAU procedure, the first action comprising, when the UE has changed location from the first cell to a second cell, which second cell belongs to the same tracking area as the first cell, triggering a TAU procedure causing the UE to apply a configuration configuring the UE to use the first timer value relating to the first time interval between subsequent signaled updates of the location of the UE in the TAU procedure; and when the UE has stopped moving, determining that the UE is stationary, when the UE has remained in the same cell in a tracking area for a period of time that exceeds a fifth threshold, causing the UE to apply a configuration configuring the UE to use the second timer value relating to the second time interval between subsequent signaled updates of the location of the UE in the TAU procedure.

6. The method according to claim 5, further comprising:
when determined that the UE is stationary, applying a configuration, received from the network node, configuring the UE to report to the network node when the UE changes its location; and when moving from its current location, reporting to the network node, that the UE has changed its location.

7. The method according to claim 6, the method further comprising:
when the UE operates in idle mode, applying a configuration, received from the network node, configuring the UE to use the first timer value relating to the first time interval between subsequent signaled updates of the location of the UE in the TAU procedure; and when determined that the UE is stationary, applying a configuration, received from the network node, configuring the UE to use the second timer value relating to the second time interval between subsequent signaled updates of the location of the UE in the TAU procedure.

8. The method according to claim 6, wherein the applied configuration configuring the UE to report to the network node when the UE changes its location comprises any one out of:
refrain from determining or reporting a change of location of the UE, determine a change of location of the UE and reporting the change of location to the network node at the time of detection; or determine a change of location of the UE and reporting the change of location when the UE has stopped moving.

9. The method according to claim 8, wherein determining a change of location comprises any one or more out of:
the UE being equipped with a movement detection tool;

using a satellite positioning system;

changing location from a serving cell to a non-serving cell;

using radio fingerprints; or using Receiving (Rx)-Transmitting (Tx) time differences.

10. The method according to claim 5, the method further comprising:
when determined that the UE has not remained in the same tracking area, triggering a TAU procedure causing the UE to apply a configuration configuring the UE to use the first timer value relating to the first time interval between subsequent signaled updates of the location of the UE in the TAU procedure.

11. The method according to claim 5, wherein the second action comprises:
predicting, based on historical data, that the UE will further change its location, and not remain in the same tracking area, within a period of time that is below a sixth threshold;

configuring the UE to refrain from triggering an upcoming TAU procedure related to a configured timer value; and when the UE has further changed its location and is not remaining in the same tracking area, triggering a TAU procedure causing the UE to apply a configuration configuring the UE to use the first timer value relating to the first time interval between subsequent signaled updates of the location of the UE in the TAU procedure.

12. The method according to claim 11, wherein the predicting comprises any one out of:
the UE has changed its location within the first cell and is predicted to further change its location to a third cell, which third cell belongs to different tracking area than the first cell; or the UE has changed its location from the first cell to the second cell, and is predicted to further change its location to the third cell, which second cell belongs to same tracking area as the first cell and which third cell belongs to a different tracking area than the first cell.

13. A network node configured to control a Tracking Area Update, TAU, procedure of a User Equipment, UE, in a wireless communications network, which TAU procedure is to signal subsequent updates of the location of the UE to the network node, and which UE is configured with a first timer value relating to a first time interval adapted to be used between subsequent signaled updates of the location of the UE in the TAU procedure, which network node is further configured to:
store a timing advance value of the UE;

determine that the UE is stationary, when the UE has remained in the same tracking area for a period of time that exceeds a first threshold;

when determined that the UE is stationary, configure the UE with a second timer value relating to a second time interval adapted to be used between subsequent signaled updates of the location of the UE in the TAU procedure, the time interval of second timer value being configured to be a time period longer than the time interval of the first timer value;

when the UE operates in connected mode, calculate a current timing advance value for the UE;

determine that the UE has changed its location when the difference between the stored timing advance value and the current timing advance value exceeds a third threshold, and when determined that the UE has changed its location, tracking the location of the UE;

determine that the UE has not changed its location when the difference between the current timing advance value and the stored timing advance value is below or equal to the third threshold; and determine that the UE is stationary, when the difference between the stored timing advance value and the current timing advance value is below or equal to the third threshold for a period of time that exceeds a second threshold.

14. The network node according to claim 13, further being configured to:

when determined that the UE is stationary, configure the UE to report to the network node when the UE changes its location;

determine that the UE has changed its location, based on a report received from the UE;

determine that the UE is stationary, when the UE has remained in the same tracking area for a period of time that exceeds a second threshold; and determine that the UE is non-stationary, when the UE has remained in the same tracking area for a period of time that is below or equal to the second threshold.

15. The network node according to claim 14, further being configured to determine that the UE has changed its location by further start tracking the location of the UE, the network node (110, 130) further being configured to:

when the UE operates in idle mode, configure the UE to use the first timer value relating to the first time interval between subsequent signaled updates of the location of the UE in the TAU procedure; and when determined that the UE is stationary, configure the UE to use the second timer value relating to the second time interval between subsequent signaled updates of the location of the UE in the TAU procedure.

16. The network node according to claim 14, further being configured to configure the UE to report to the network node, when the UE changes its location by further configuring the UE to any one out of:

refrain from determine or report a change of location of the UE;

determine a change of location of the UE and report the change of location to the network node at the time of detection; or determine a change of location of the UE and report the change of location when the UE has stopped moving.

17. A User Equipment, UE, configured to control a Tracking Area Update, TAU, procedure of the UE in a wireless communications network, which TAU procedure is to signal subsequent updates of the location of the UE to the network node, and which UE is configured with a first timer value relating to a first time interval adapted to be used between subsequent signaled updates of the location of the UE in the TAU procedure, which UE is further configured to:

receive a configuration from the network node, which configuration is adapted to configure the UE with a second timer value relating to a second time interval to be used between subsequent signaled updates of the location of the UE in the TAU procedure, the time interval of second timer value being configured to be a time period longer than the time interval of the first timer value; and determining that the UE is stationary, when the UE has remained in a first cell in a tracking area for a period of time that exceeds a fourth threshold, causing the UE to apply a configuration configuring the UE to use the second timer value relating to the second time interval between subsequent signaled updates of the location of the UE in the TAU procedure;

when determined that the UE is stationary, apply the received configuration;

in response to the UE changing its location, determining whether or not the UE remains in the same tracking area;

when determined that the UE has remained in the same tracking area, performing any one out of a first action and a second action, which first action and second action are related to triggering a TAU procedure, the first action comprising, when the UE has changed location from the first cell to a second cell, which second cell belongs to the same tracking area as the first cell, triggering a TAU procedure causing the UE to apply a configuration configuring the UE to use the first timer value relating to the first time interval between subsequent signaled updates of the location of the UE in the TAU procedure; and when the UE has stopped moving, determining that the UE is stationary, when the UE has remained in the same cell in a tracking area for a period of time that exceeds a fifth threshold, causing the UE to apply a configuration configuring the UE to use the second timer value relating to the second time interval between subsequent signaled updates of the location of the UE in the TAU procedure.

\* \* \* \* \*